(12) United States Patent
Huff et al.

(10) Patent No.: US 11,367,916 B2
(45) Date of Patent: Jun. 21, 2022

(54) MODULAR BATTERY COVER FOR ELECTRIC VEHICLE

(71) Applicant: Artisan Vehicle Systems Inc., Camarillo, CA (US)

(72) Inventors: Brian R. Huff, Newbury Park, CA (US); Michael E. Kasaba, Malibu, CA (US); Kyle Hickey, Moorpark, CA (US)

(73) Assignee: ARTISAN VEHICLE SYSTEMS, INC., Camarillo, CA (US)

( * ) Notice: Subject to any disclaimer, the term of this patent is extended or adjusted under 35 U.S.C. 154(b) by 369 days.

(21) Appl. No.: 15/712,114

(22) Filed: Sep. 21, 2017

(65) Prior Publication Data

US 2018/0090725 A1 Mar. 29, 2018

Related U.S. Application Data

(60) Provisional application No. 62/398,861, filed on Sep. 23, 2016.

(51) Int. Cl.
*H01M 50/147* (2021.01)
*B60L 50/64* (2019.01)
*H01M 50/20* (2021.01)

(52) U.S. Cl.
CPC .......... *H01M 50/147* (2021.01); *B60L 50/64* (2019.02); *H01M 50/20* (2021.01); *B60Y 2410/10* (2013.01); *H01M 2220/20* (2013.01); *Y02T 10/70* (2013.01)

(58) Field of Classification Search
CPC ............... H01M 2/043; H01M 2/1077; H01M 2220/20; H01M 2/1016; H01M 50/147; H01M 50/20; H01M 50/148; H01M 50/15; H01M 50/166; B60L 50/64; Y02T 10/7005; Y02T 10/705; Y02T 10/70; B60Y 2410/10; H01R 11/00; H01R 11/281; H01R 11/288; H01R 11/502; Y02E 60/10

See application file for complete search history.

(56) References Cited

U.S. PATENT DOCUMENTS

| 2012/0121948 | A1 | 5/2012 | Asahina et al. |
| 2012/0223113 | A1 | 9/2012 | Gaisne et al. |
| 2012/0315517 | A1 | 12/2012 | Duff et al. |
| 2013/0043826 | A1* | 2/2013 | Workman .......... H01M 2/0245 320/101 |

(Continued)

FOREIGN PATENT DOCUMENTS

| CN | 201194240 | * | 2/2009 | ............. H01M 2/10 |
| DE | 112012004687 T5 | | 8/2014 | |

(Continued)

OTHER PUBLICATIONS

English translation of CN 201194240.*

(Continued)

*Primary Examiner* — Kiran Akhtar
(74) *Attorney, Agent, or Firm* — Plumsea Law Group, LLC

(57) ABSTRACT

A modular cover for a battery system and a method for assembling the modular cover are disclosed. The apparatus can include a first modular segment and a second modular segment that are interconnected. The modular cover can be expanded in size for use with different types of battery systems and housings.

16 Claims, 22 Drawing Sheets

(56) References Cited

U.S. PATENT DOCUMENTS

| | | | |
|---|---|---|---|
| 2013/0095359 A1* | 4/2013 | Yoshioka | H01M 50/20 |
| | | | 429/99 |
| 2013/0178091 A1* | 7/2013 | Ogasawara | H01M 50/20 |
| | | | 439/366 |
| 2013/0202926 A1 | 8/2013 | Yoon | |
| 2016/0028194 A1* | 1/2016 | Nakayama | H01M 50/502 |
| | | | 439/620.21 |

FOREIGN PATENT DOCUMENTS

| | | | | |
|---|---|---|---|---|
| EP | 2669972 A1 | 12/2013 | | |
| KR | 1020150113827 A | 10/2015 | | |
| WO | WO2014/156580 | * 10/2014 | | H01M 2/20 |

OTHER PUBLICATIONS

International Search Report and Written Opinion dated Jan. 9, 2018 for International Application No. PCT/US2017/052921.
Extended European Search Report dated Apr. 28, 2020 for European Patent Application No. EP17853973.0.

* cited by examiner

MODULAR BATTERY COVER FOR ELECTRIC VEHICLE

CROSS-REFERENCE TO RELATED APPLICATION(S)

This application claims the benefit under 35 U.S.C. 119(e) to application Ser. No. 62/398,861 titled "Modular Battery Cover for Electric Vehicle" and filed on Sep. 23, 2016, the entirety of which is incorporated herein by reference.

This application is related to U.S. Patent Application Publication Number 2018/0090797, filed on Sep. 21, 2017, and U.S. Patent Application Publication Number 2018/0090735, filed on Sep. 21, 2017, which are both hereby incorporated in their entirety.

BACKGROUND OF THE INVENTION

1. Field of the Invention

The present disclosure relates generally to a battery system, particularly a battery system used in heavy duty electric vehicles in mining operations. The battery system is at least partially enclosed by a housing.

2. Description of Related Art

Large, high voltage batteries are used in heavy duty applications, such as in electric and hybrid vehicles used in underground mining. These batteries often include multiple battery modules each containing a set of individual battery cells. A description of this type of battery module system is provided in co-pending U.S. patent application Ser. No. 14/494,133, which is hereby incorporated in its entirety. A description of a battery module maintenance system is provided in co-pending U.S. patent application Ser. No. 14/721,726 which is also hereby incorporated in its entirety. A description of the electric power generation in an underground mining environment is provided in pending U.S. patent application Ser. No. 15/133,478, which is hereby incorporated in its entirety.

The underground mining environment presents particular challenges to the equipment used in mining. Electric vehicles are used to reduce emissions and control temperatures in the mining rooms. This can be a dirty, dusty and dark environment, and there is a need to protect the battery module from the environment while making access to the module and assembly and disassembly easy. Each battery module comprises cells, and a grouping of modules may be employed together. Depending on the size or configuration of the electric vehicle or equipment that needs to be powered, the number and configuration of the battery modules employed may vary. It may be desirable to vary the battery module configuration itself. There is a need for a cover assembly for the housing which is scalable and adjustable for different shapes and configurations of batteries.

SUMMARY

The disclosed modular battery cover is comprised of modular segments that are linked together to form the desired size and shape of a cover. This enables an array of different shapes and sizes to be configured depending on the shape and size of the battery module to be housed.

The embodiments disclosed herein are directed to a modular cover that may be used with a battery system. The modular cover can include one or more modular segments that are linked together. Each of the modular segments includes provisions for being interconnected with additional modular segments. In other words, the assembled modular cover can be decreased or increased in size by quickly adding or removing modular segments to the modular cover. Furthermore, in some cases, the modular segments can include provisions to permit the modular cover to be readily secured and fastened to a housing for a battery.

In one aspect, the present disclosure is directed to a cover for a battery, the cover including a plurality of modular segments. The plurality of modular segments include a first modular segment and a second modular segment, and each of the plurality of modular segments include a central portion extending between a first end portion and a second end portion. Furthermore, a central longitudinal axis extends from the first end portion to the second end portion, the central longitudinal axis being approximately aligned with a longitudinal midline of the modular segment, and the central longitudinal axis approximately dividing the modular segment into two opposing sides along a lateral axis. The two sides comprise a first side and a second side. In addition, the first modular segment includes a first slot formed on the first side, and the second modular segment includes a first protruding portion formed on the second side. The first slot is configured to snugly receive the first protruding portion and provide an interconnection between the first modular segment and the second modular segment, and a first outermost surface of the first modular segment is flush with a second outermost surface of the second modular surface when the first modular segment and the second modular segment are interconnected.

In another aspect, the present disclosure is directed to a cover for a battery housing, the cover including a plurality of modular segments, where the plurality of modular segments include a first modular segment. In addition, each of the modular segments have a top side and a bottom side, and each of the plurality of modular segments include a central portion extending between a first end portion and a second end portion. There is a central longitudinal axis extending from the first end portion to the second end portion, the central longitudinal axis being approximately aligned with a longitudinal midline of the modular segment, and the central longitudinal axis approximately divides the modular segment into two opposing sides along a lateral axis. The two sides comprise a first side and a second side. Furthermore, the central portion is recessed with respect to the first end portion and the second end portion. The first end portion includes a first ridge portion adjacent to a first channel, the first ridge portion extending from the first side to the second side, and the first channel extending from the first side to the second side. In addition, the first end portion includes a first peripheral portion, where a first recess is formed through the first peripheral portion, and there are a plurality of through-hole apertures formed in each of the plurality of modular segments. A plurality of elongated members extend outward from the bottom side of each of the plurality of modular segments.

In another aspect, the present disclosure is directed to a method of assembling a modular cover for a battery system. The method includes placing a first modular segment adjacent to a second modular segment, and orienting the first modular segment such that a first side of the second modular segment faces toward a second side of the first modular segment. In addition, the method further includes aligning a first protruding portion formed on the second side of the first modular segment with a first slot formed on the first side of the second modular segment, and inserting the first protruding portion into the first slot, thereby interconnecting the first modular segment to the second modular segment and forming an assembled modular cover.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The embodiments can be better understood with reference to the following drawings and description. The drawings are schematic and, therefore, the components in the figures are not necessarily to scale, emphasis instead being placed upon illustrating the principles of the embodiment. Moreover, in the figures, like reference numerals designate corresponding parts throughout the different views.

DETAILED DESCRIPTION

Figure 1:
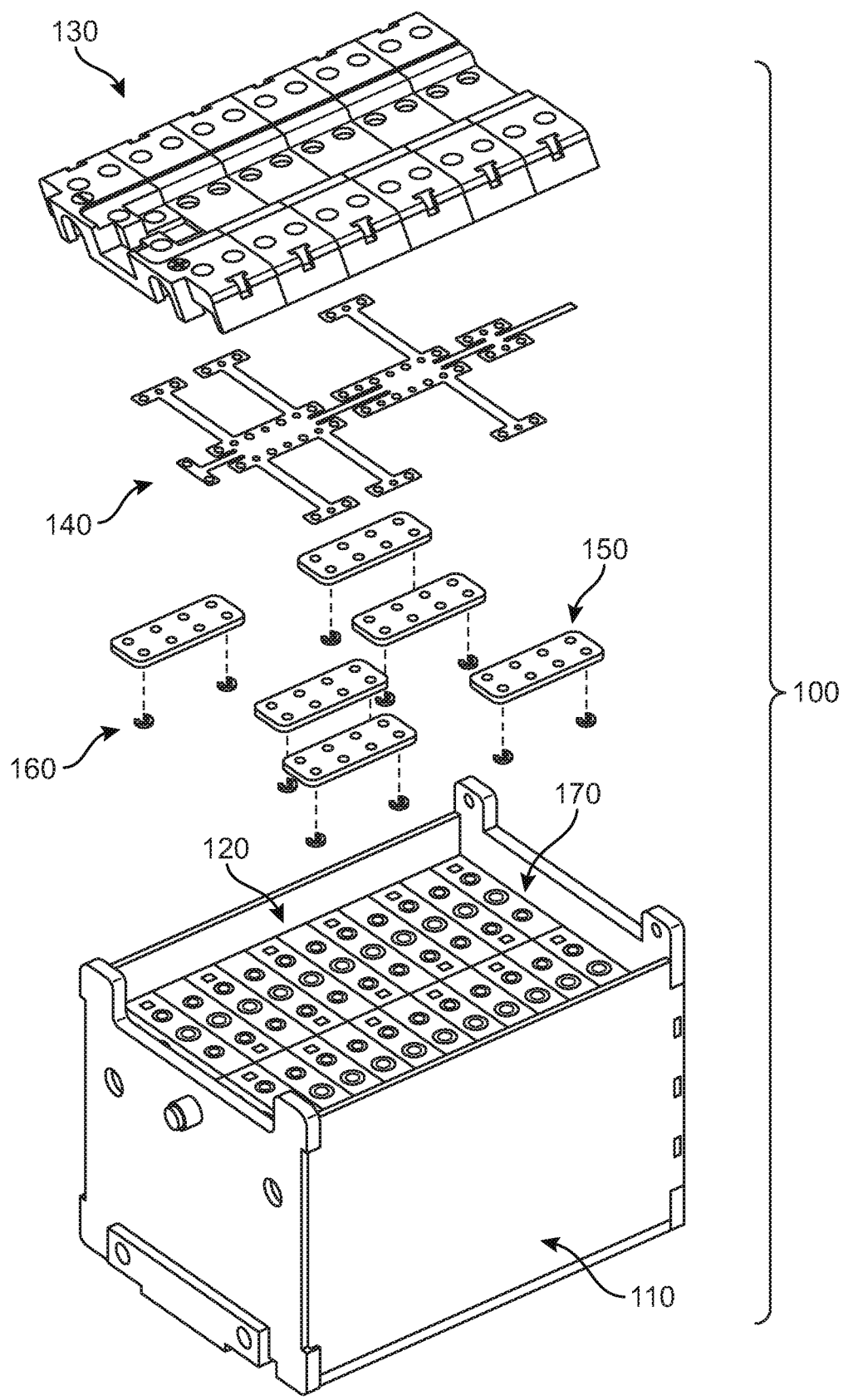
FIG. 1 is an exploded view of an embodiment of a battery system.

The following discussion and accompanying figures disclose a modular cover system for a battery system. There are numerous possible variations for the exact shape and scale of the battery system and associated components of the battery system depending on the intended use. A few exemplary embodiments are illustrated and described herein, and by no means are limiting of the claimed invention. Concepts associated with the modular cover system disclosed herein may be applied to any field where energy is desirable. Concepts and features of the modular cover system may also be applied to a variety of battery types. In some cases, these batteries can be used in a wide variety of fields, activities, and applications including, but not limited to, hybrid vehicles, electric vehicles, mining equipment, pumps, compressors, and the like. For example, referring to FIG. 1, a battery system 100 can include multiple components, such as a housing 110, a battery 120, a modular cover ("cover") 130, a film array 140, one or more busbars 150, and one or more securing components 160. The term, "battery" means a single battery, the partial resources or partial structure of a single battery, or two or more batteries associated with one another. In some cases the batteries may be connected in such a way that their output is combined or multiplied. The term, "battery" could be any kind of device that stores potential energy. In some cases, the "battery" may be constructed as a lead acid battery, a lithium-ion battery, a lithium-ion polymer battery, a nickel cadmium battery, a nickel-zinc battery, a nickel-metal hydride battery, a reusable alkaline battery, a silver-zinc battery, a thermal battery, or other battery types. More detail will be provided with respect to the various components of battery system 100 further below.

Housing 110 can vary in size, shape, and dimensions in different embodiments. In one embodiment, the structure of housing 110 is configured to substantially surround, encase, and/or snugly receive a battery. Thus, in different embodiments, depending on the size and dimensions of battery 120 that is to be utilized, housing 110 can be larger or smaller in volume and/or shape. In FIG. 1, housing 110 has a generally rectangular-cuboid or rectangular box shape. For example, in one embodiment, housing 110 can include a four-sided casing with a planar bottom and an open top configured to receive cover 130.

Housing 110 can include provisions to receive or otherwise engage with cover 130. In some embodiments, when cover 130 is secured, placed, or disposed on housing 110, battery system 100 can comprise a substantially closed system. In other words, in one embodiment, cover 130 can extend across the entire width and length of an access opening 170 provided at the top of housing 110 and provide an approximately continuous outer covering.

As noted above, housing 110 and/or battery 120 may vary in size and volume in different embodiments. In order to facilitate the adjustments in size that may occur during the use of, manufacture of, or adjustments to battery system 100, cover 130 can include provisions to permit the ready expansion of the cover to a larger size or a quick decrease in size of the cover, and to accommodate different types of housings.

Figure 2:
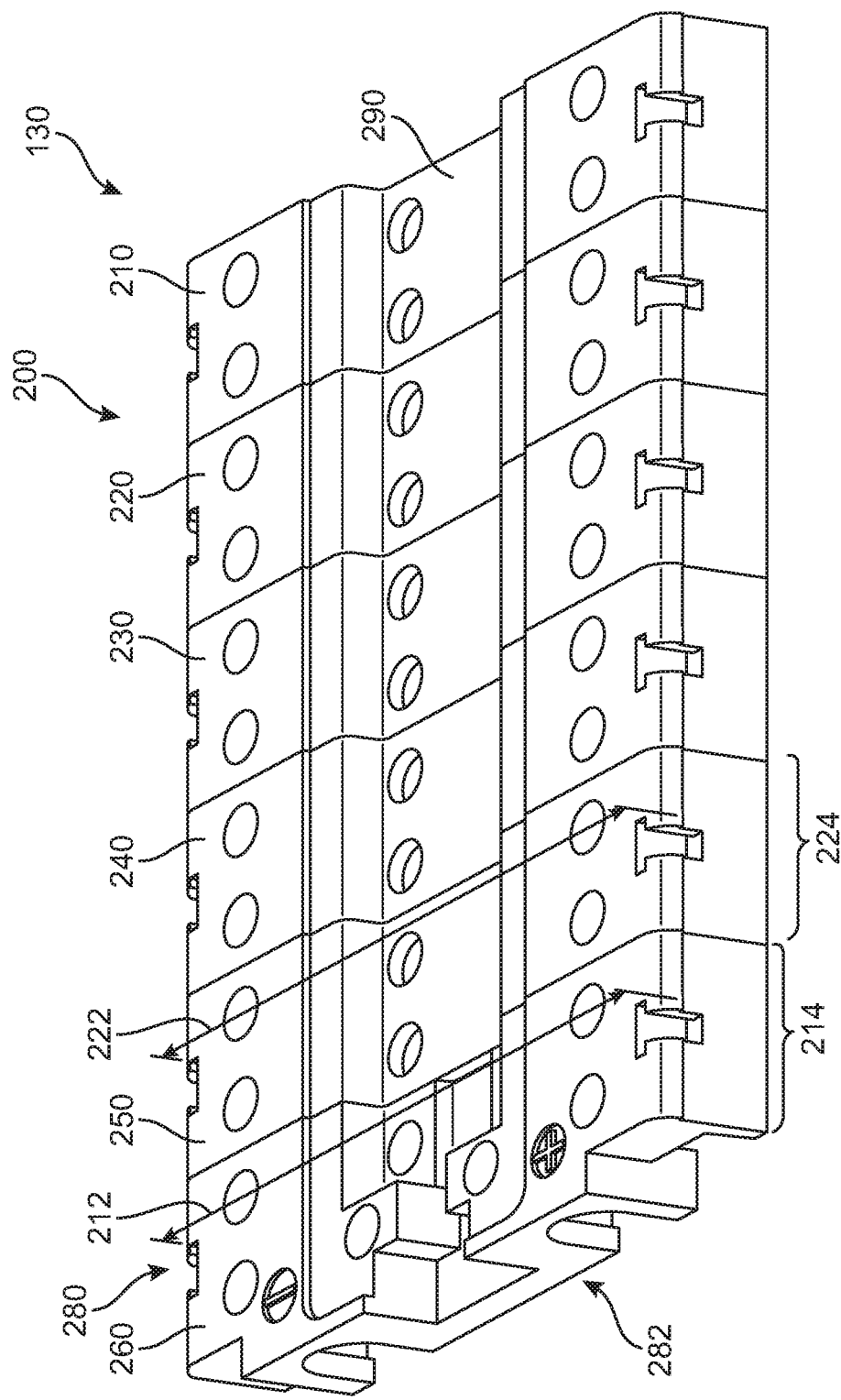
FIG. 2 is an isometric top view of an embodiment of a modular cover.
Figure 3:
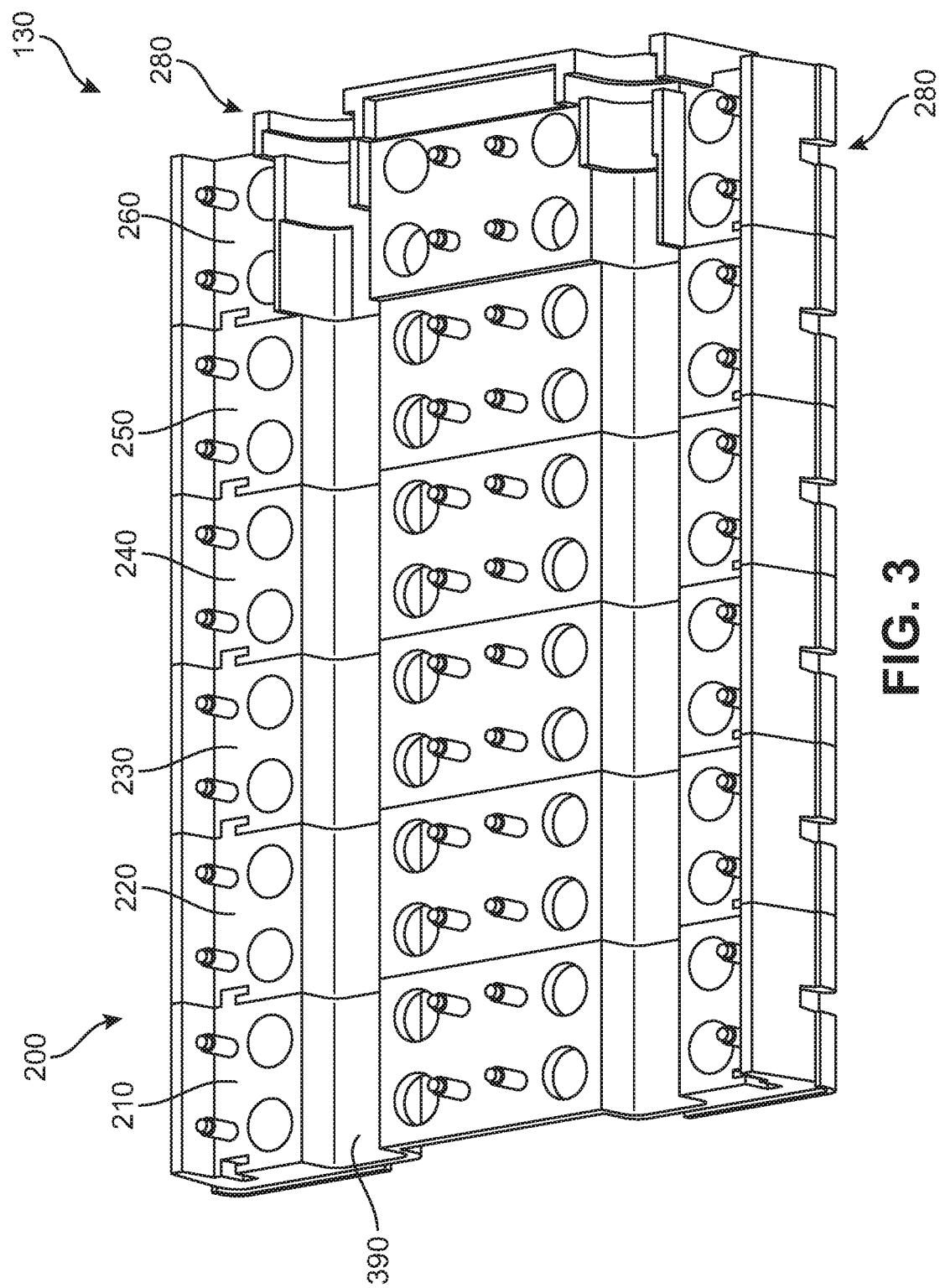
FIG. 3 is an isometric bottom view of an embodiment of a modular cover.

Referring to FIGS. 2 and 3, cover 130 can include one or more portions or units that are configured to interconnect. FIG. 2 shows an isometric view of a top side 290 of cover 130, and FIG. 3 shows an isometric view of a bottom side 390 of cover 130, where top side 290 is the opposite facing side relative to bottom side 390. It can be understood that when cover 130 is disposed atop of a battery system, the bottom side of cover 130 is the side of cover 130 configured to face inward toward the battery, while the top side is the side of cover 130 configured to face away or outward from the battery.

As shown in FIGS. 2 and 3, in different embodiments, cover 130 can comprise a plurality of modular cover segments 200. For purposes of this description, the use of the term modular refers to a structure or component that is capable of fitting together with other structures or components. Each of the components can have a generally standardized or uniform structure and include provisions for interconnecting the components, such that a number of the modules can be readily coupled together and form different sized battery housing covers. Thus, regardless of the overall size and dimensions of an individual modular cover segment, each modular cover segment can be coupled to another modular cover segment. In one embodiment, the coupling comprises a releasable interconnection.

For example, in FIGS. 2 and 3, cover 130 includes a first segment 210, a second segment 220, a third segment 230, a fourth segment 240, a fifth segment 250, and a sixth segment 260. It should be understood that in other embodiments a modular cover can comprise any number of modular cover segments 200, ranging between a single modular cover segment to dozens of modular cover segments. Thus, while cover 130 is shown with six segments in FIGS. 2 and 3, a modular cover can be expanded or decreased in the number of modules in order to customize the size of the cover, as will be discussed with respect to FIGS. 8-12 below.

In different embodiments, cover 130 can include modular segments that are substantially standardized in size and dimension and can be arranged or fitted together in a variety of ways. In other words, two or more units comprising the cover can be substantially similar or uniform in size, shape, and/or dimensions. Each of the modular segments may include provisions to permit each of the segments to be joined or secured to additional segments.

However, it should be understood that while some embodiments of cover 130 can include segments that are substantially similar or identical to one another, in other embodiments, cover 130 can include one or more modular segments that differ in size, dimensions, shape, or include other features that differ from the other modular segments comprising cover 130. For example, in FIGS. 2 and 3, while each of first segment 210, second segment 220, third segment 230, fourth segment 240, and fifth segment 250 are substantially similar, sixth segment 260 can be seen to differ from each of first segment 210, second segment 220, third segment 230, fourth segment 240, and fifth segment 250. In one embodiment, sixth segment 260 may comprise different structural features that facilitate the use of cover 130 with the battery system, yet still allow sixth segment 260 to be joined to the other modular segments.

In FIGS. 2 and 3, sixth segment 260 may be understood to comprise a type of terminal cover segment or terminal portion. Sixth segment 260 includes a main portion 280 and a ledge portion 282 extending away from main portion 280. Main portion 280 may be approximately similar to the neighboring modular segments in some embodiments, though in other embodiments there may be differences. As shown in FIG. 3, main portion 280 is disposed adjacent to fifth segment 250, and ledge portion 282 is a free end disposed on the opposite side. In one embodiment, as shown in FIG. 2, a first length 212 of sixth segment 260 is substantially similar to a second length 222 of fifth segment 250. However, it can be seen that a first width 214 of sixth segment 260 is larger or further extended relative to a second width 224 of fifth segment 250, due to the inclusion of ledge portion 282. In different embodiments, ledge portion 282 and main portion 280 can be integrally joined, though in other embodiments, they may comprise two separate components that are interconnected as modules during assembly of the cover. The terminal cover segment will be discussed further with respect to FIGS. 6 and 7 below.

Figure 4:
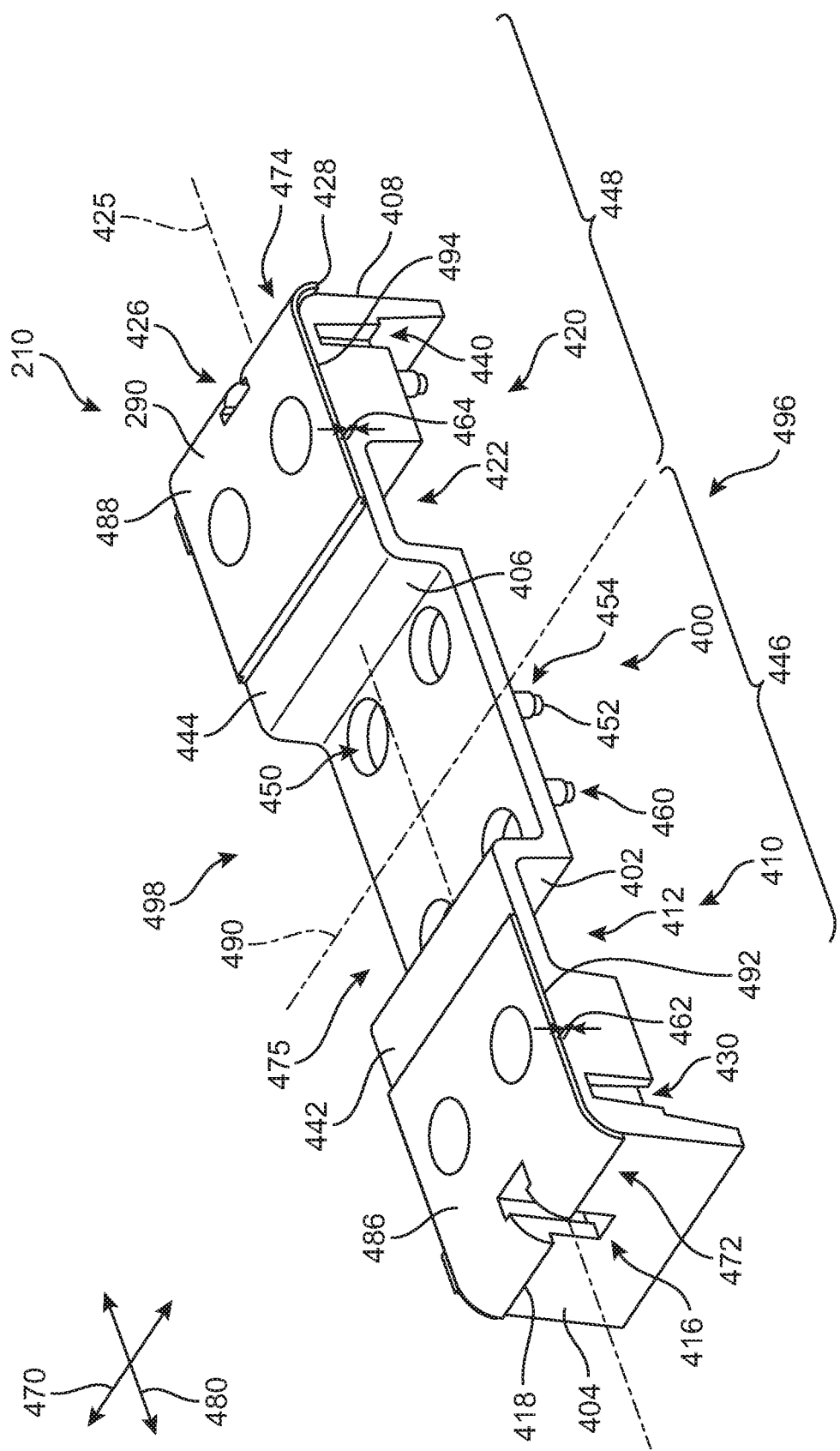
FIG. 4 is an isometric top view of an embodiment of a first modular cover segment.
Figure 5:
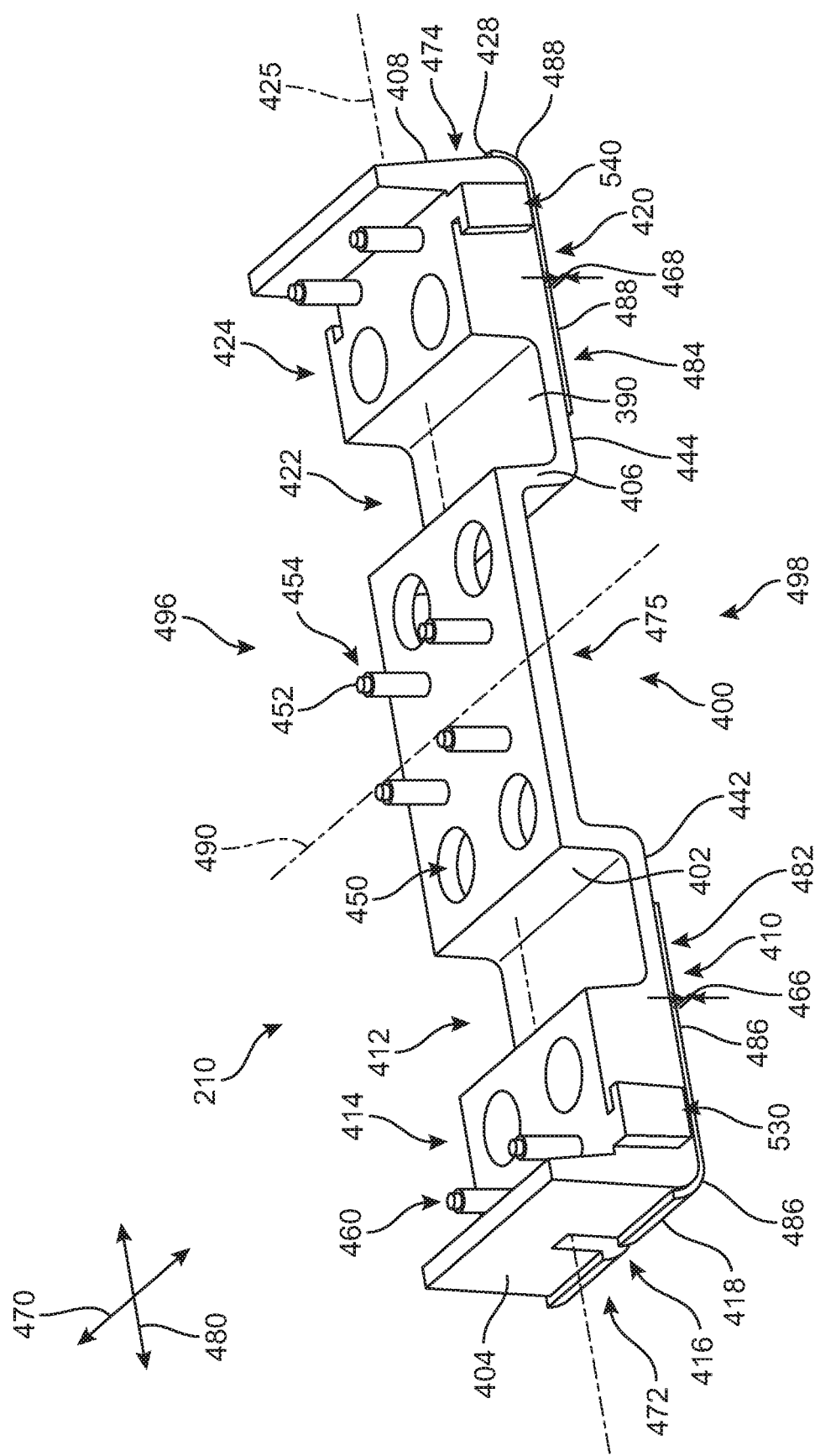
FIG. 5 is an isometric bottom view of an embodiment of a first modular cover segment.

The structure of the modular cover segments can vary in different embodiments. Referring now to FIGS. 4 and 5, in some embodiments, a modular cover segment can include provisions for interconnection to other modular segments, as well as for facilitating the placement and use of the cover atop of various components of a battery system. FIG. 4 shows an isometric view of top side 290 of first segment 210, and FIG. 5 shows an isometric view of bottom side 390 of first segment 210.

The embodiment of first segment 210 shown in FIGS. 4 and 5 can be understood to comprise various portions, including a central portion 400 extending between a first end portion 410 and a second end portion 420. In other words, first end portion 410 and second end portion 420 are spaced apart by central portion 400 along a direction substantially aligned with a longitudinal axis 480. In one embodiment, central portion 400 can be recessed or have a top side surface that is lower relative to first end portion 410 and second end portion 420 (see FIG. 4).

In addition, as best seen in FIG. 5, a first channel 412 is formed through and extends along a direction substantially aligned with a lateral axis 470 through the width of first end portion 410 along bottom side 390, and a second channel 422 is formed through and extends along a direction substantially aligned with lateral axis 470 through the width of second end portion 420 along bottom side 390. Furthermore, bounding one side of first channel 412 is a first ridge portion 414, and bounding the opposing side of first channel 412 is a first inner sidewall 402. Similarly, bounding one side of second channel 422 is a second ridge portion 424, and bounding the opposing side of second channel 422 is a second inner sidewall 406. In some embodiments, first channel 412 and second channel 422 can each provide an approximately U-shaped opening or compartment extending along the lateral width of the modular cover segment.

Referring to FIG. 4, in some embodiments, first inner sidewall 402 and second inner sidewall 406 can extend outward from central portion 400. In one embodiment, the inner sidewalls may rise generally vertically upward relative to the relatively horizontally planar surface comprising central portion 400, forming a U-shaped cavity or compartment 475 along top side 290. Each of the inner sidewalls may extend upward and join a substantially horizontally planar surface that at least in part forms the substantially flat "roof" of each channel in some embodiments. In other words, in FIGS. 4 and 5, first inner sidewall 402 extends away from one side of central portion 400 and merges into a first base portion 442 of first end portion 410. In one embodiment, first base portion 442 is disposed or extends between first inner sidewall 402 and a first outer sidewall 404. Similarly, in some embodiments, second inner sidewall 406 extends away from the other side of central portion 400 and merges into a second base portion 444 of second end portion 420.

In one embodiment, second base portion 444 is disposed or extends between second inner sidewall 406 and a second outer sidewall 408. In FIGS. 4 and 5, each of the junctions between the inner sidewalls and central portion 400 include a curved region that is approximately perpendicular. In other embodiments, though, an inner sidewall may be disposed directly vertical against an edge of central portion 400, forming a ninety degree angle. In another embodiment, the curvature can comprise an acute or obtuse angle.

In different embodiments, a modular cover segment can have generally or substantially symmetrical structural features. For example, referring to first segment 210 in FIG. 4, it can be seen that a first portion 446 is substantially symmetrical with respect to a second portion 448 relative to a lateral midline 490 (shown in dotted line). In other words, in some embodiments, one portion of a modular cover segment can be an approximate mirror-image of another portion of the same modular cover segment. While FIGS. 3 and 4 depict a laterally-based symmetry, other embodiments of a modular cover segment may include a longitudinally-based symmetry. In some other embodiments, however, a modular cover segment may not have such symmetry and may be substantially asymmetrical.

In different embodiments, a modular cover segment can include provisions for being disposed on or secured with a housing or other such casing or container. For example, a first lip portion 418 extends distally away from first outer sidewall 404 and a second lip portion 428 extends distally away from second outer sidewall 408. In some embodiments, a lip portion can include a width or thickness sufficient to extend the longitudinal length of the modular cover segment beyond a length of the access opening of the housing, creating a securing 'ledge' or overhang that can rest upon a portion of the housing walls (see FIG. 19).

Furthermore, in one embodiment, first end portion 410 can include a first recess 416 disposed within first outer sidewall 404, and second end portion 420 can include a second recess 426 disposed within second outer sidewall 408. In some embodiments, first recess 416 and second recess 426 can extend inward from a periphery of an end portion of the modular segment. For example, first recess 416 can be understood to be formed along a first peripheral portion 472 of first end portion 410 and second recess 426 can be understood to be formed along a second peripheral portion 474 of second end portion 420 in one embodiment. In one embodiment, each recess extends through the lip portions that extend from the modular segment. For example, in FIG. 4, first recess 416 is formed through first lip portion 418 that is associated with first peripheral portion 472 and second recess 426 is formed through second lip portion 428 that is associated with second peripheral portion 474. In one embodiment, each recess is positioned or formed along a center of the peripheral portion. In addition, each recess can be configured to receive various connecting components or to engage with other components, providing a means of fastening, latching, locking, or otherwise securing the modular cover segment to another structure, such as a portion of the housing. This connecting mechanism will be discussed further with respect to FIGS. 17-19.

In different embodiments, the modular cover segments can include provisions for viewing, adjusting, contacting, and/or otherwise interacting with components that are disposed within the battery system when the battery system is fully enclosed by the housing and the modular cover. As shown in FIGS. 4 and 5, in one embodiment, a modular cover segment can include one or more apertures 450.

In the example shown in FIGS. 4 and 5, apertures 450 comprise a plurality of through-hole apertures, where each aperture forms a hole that extends all the way through the thickness of the modular cover segment. Such apertures may be referred to as "through-hole apertures". In some embodiments, through-hole apertures may extend from top side 290 to bottom side 390 of first segment 210. However, in other embodiments, first segment 210 may not include any through-hole apertures, or may include one or more through-hole apertures as well as one or more non through-hole apertures, herein referred to as blind-hole apertures. Thus, in some embodiments, one or more apertures 450 may be blind-hole apertures, so that an opening of the aperture occurs only on one side or surface of the modular cover segment. In other embodiments, there may be through-hole apertures in certain portions of the modular cover segment and blind-hole apertures in other portions.

In FIGS. 4 and 5, each end portion includes two through-hole apertures that extend through the thickness of the ridge portion, and central portion 400 includes a set of four apertures that extend through the thickness of the central portion 400, providing a total of six apertures. In other embodiments, a modular segment may include a greater number of or fewer apertures. In one embodiment, the vertical depth of the apertures formed in the end portions is greater than the vertical length of the apertures formed in the central portion.

Furthermore, first segment 210 can include provisions for facilitating the assembly of a modular cover segment with other components (see FIGS. 13 and 14) that may be disposed and/or secured along bottom side 390 of the cover. In some embodiments, there may be projections, protrusions, or other types of elongated retaining members formed along a surface side of a modular cover segment. As best shown in FIG. 4, in one embodiment, bottom side 390 can include a plurality of elongated members 460. For example, first segment 210 has two elongated members associated with first end portion 410, extending vertically outward from first ridge portion 414, and two elongated members associated with second end portion 420, extending vertically outward from second ridge portion 424. In addition, a set of four elongated members extend vertically outward from central portion 400, providing a total of six elongated members. In other embodiments, a modular segment can include a greater number of or fewer elongated members. Each elongated member can comprise a substantially cylindrical geometry. In one embodiment, a first elongated member 454 can also include a tip portion 452, which comprises a relatively smaller cylindrical portion at the end of the elongated member, providing a circular ledge or lip around tip portion. In some embodiments, tip portion 452 can allow elongated members 460 to better join with, connect or engage with securing components (see FIG. 1).

As noted above, various modular cover segments can also include provisions for being interconnected in a modular arrangement. In FIGS. 4 and 5, it can be seen that in some embodiments a modular cover segment may comprise a slot or recess that can be configured to receive or engage with another modular portion. In one embodiment, as shown in FIG. 4, first end portion 410 has a first slot 430 formed in first ridge portion 414, and second end portion 420 has a second slot 440 formed in second ridge portion 424. Furthermore, as first segment 210 is flipped 'upside-down' to the perspective of FIG. 5, it can be seen that on the opposite side of first end portion 410, a first protruding portion 530 extends outward from first ridge portion 414, and on the opposite side of second end portion 420 a second protruding portion 540 extends outward from second ridge portion 424. Thus, in one embodiment, slots can be formed on a first side portion of the modular segment and protruding portions are formed on a second (opposing) side portion of the modular segment.

For purposes of reference, it can be seen in FIG. 4 that first segment 210 can be divided into two opposing sides along lateral axis 470 by a longitudinal midline 425 (shown in dotted line), where the two sides comprise a first side 496 and a second side 498. Thus, in one embodiment, first side 496 includes first slot 430 and second slot 440 (see FIG. 4), and second side 498 includes first protruding portion 530 and second protruding portion 540 (see FIG. 5). In other words, in some embodiments, the first side can be associated with the receiving or female side of a modular segment and the second (opposite facing) side can be associated with the engaging or male side of the modular segment. In some embodiments, the channels and the ridge portions of a modular segment can be understood to extend from first side 496 to second side 498 in a direction substantially aligned with lateral axis 470.

Furthermore, in other embodiments, modular segments can include provisions for being positioned directly adjacent to one another and providing outermost surface portions of the cover that are substantially continuous, even, level, and/or flush along the top side of the cover. In FIG. 4, it can be seen that first segment 210 has a first outermost portion 486 that comprises a topmost surface of the modular segment associated with first end portion 410 as well as a second outermost portion 488 that provides a topmost surface of the modular segment associated with second end portion 420.

In different embodiments, first outermost portion 486 includes a first overhang portion 492 and second outermost portion 488 includes a second overhang portion 494. First overhang portion 492 extends in a direction away from longitudinal midline 425 on first side 496, and second overhang portion 494 extends in a direction away from longitudinal midline 425 on first side 496. As shown in FIG. 4, in one embodiment, first overhang portion 492 bulges or protrudes outward relative to the main body or first base portion 442 of first end portion 410 by a first distance, and second overhang portion 494 bulges or protrudes outward relative to the main body or second base portion 444 of second end portion 420 by a second distance. In some embodiments, the first distance and the second distance are substantially similar, though in other embodiments, the first distance and the second distance can differ. The distance associated with an overhang portion will be described in greater detail with respect to FIG. 9. In addition, in some embodiments, first overhang portion 492 can provide a raised surface relative to first base portion 442, and second overhang portion 494 can provide a raised surface relative to second base portion 444. In other words, in one embodiment, the thickness of each end portion is increased in the regions where the overhang portions are disposed. For purposes of reference, first overhang portion 492 can be understood to comprise a first thickness 462 and second overhang portion 494 can be understood to comprise a second thickness 464. In some embodiments, first thickness 462 and second thickness 464 are substantially similar (see FIG. 4), though in other embodiments, first thickness 462 and second thickness 464 can differ.

Figure 12:
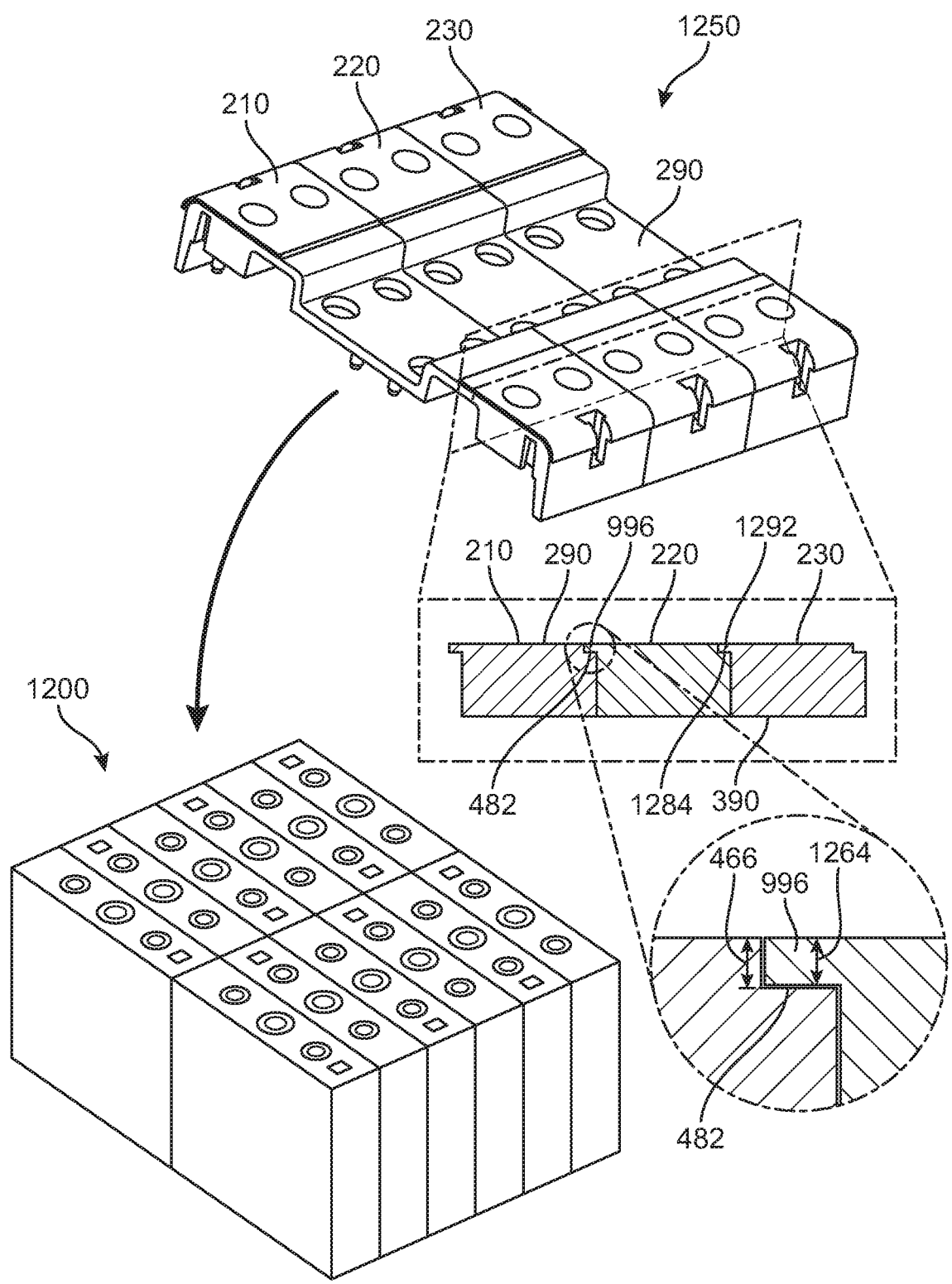
FIG. 12 is an isometric top view of an embodiment of a second modular cover and a battery.

In addition, in some embodiments, first outermost portion 486 can include portions that are recessed, and second outermost portion 488 can include portions that are recessed (see for example, the cross section provided in FIG. 12). These recessed regions can be configured to receive overhang portions in some embodiments. In FIG. 5, first end portion 410 has a first recessed ledge 482 on second side 498 and second end portion 420 has a second recessed ledge 484 on second side 498. In one embodiment, first recessed ledge 482 can be configured to receive or engage with a first overhang portion of an adjacent modular segment, and second recessed ledge 484 can be configured to receive or engage with a second overhang portion of an adjacent modular segment. Thus, in some embodiments, first recessed ledge 482 extends outward in a direction away from longitudinal midline 425 a third distance and second recessed ledge 484 extends outward in a direction away from longitudinal midline 425 a fourth distance. Furthermore, first recessed ledge 482 can have a first depth 466 and second recessed ledge 484 can have a second depth 468.

As noted above, in some embodiments, a recessed ledge can be sized and dimensioned to fit or receive the thickness and distance associated with an overhang portion of an adjacent modular segment. In other words, in one embodiment, the third distance is substantially similar to the first distance, and the fourth distance is substantially similar to the second distance. In addition, in one embodiment, referring to FIGS. 4 and 5, first depth 466 is substantially similar to first thickness 462, and second depth 468 is substantially similar to second thickness 464. The protruding portions and corresponding slots as well the outermost surface provisions formed in the modular cover segments mentioned here will be discussed in further detail below with respect to FIGS. 8-12.

Furthermore, referring back to the peripheral portions of the modular segment, it can be understood that in some embodiments, first recess 416 extends through both first outermost portion 486 and first base portion 442 of first end portion 410. Similarly, in some embodiments, second recess 426 can be understood to extend through both second outermost portion 488 and second base portion 444 of second end portion 420. In one embodiment, first recess 416 and/or second recess 426 can be positioned approximately in the center of the peripheral portions. In some embodiments, first recess 416 and/or second recess 426 are disposed around or on longitudinal midline 425.

Figure 6:
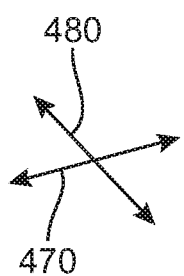
FIG. 6 is an isometric top view of an embodiment of a terminal modular cover segment.
Figure 6:
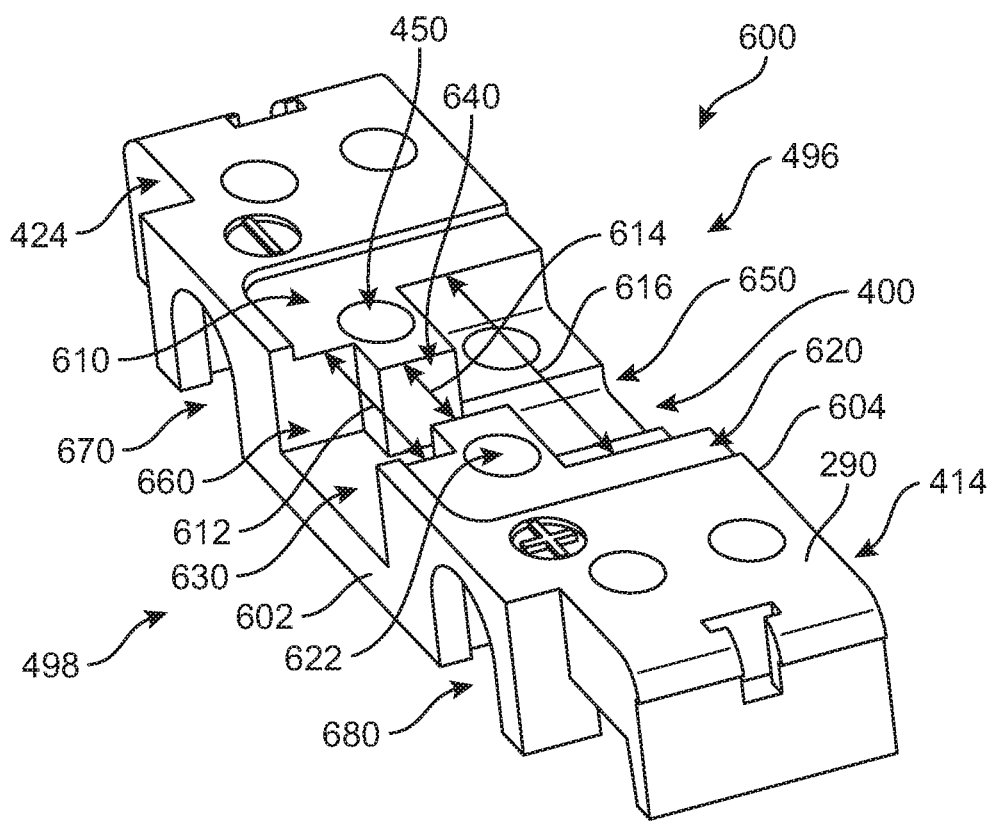
Figure 7:
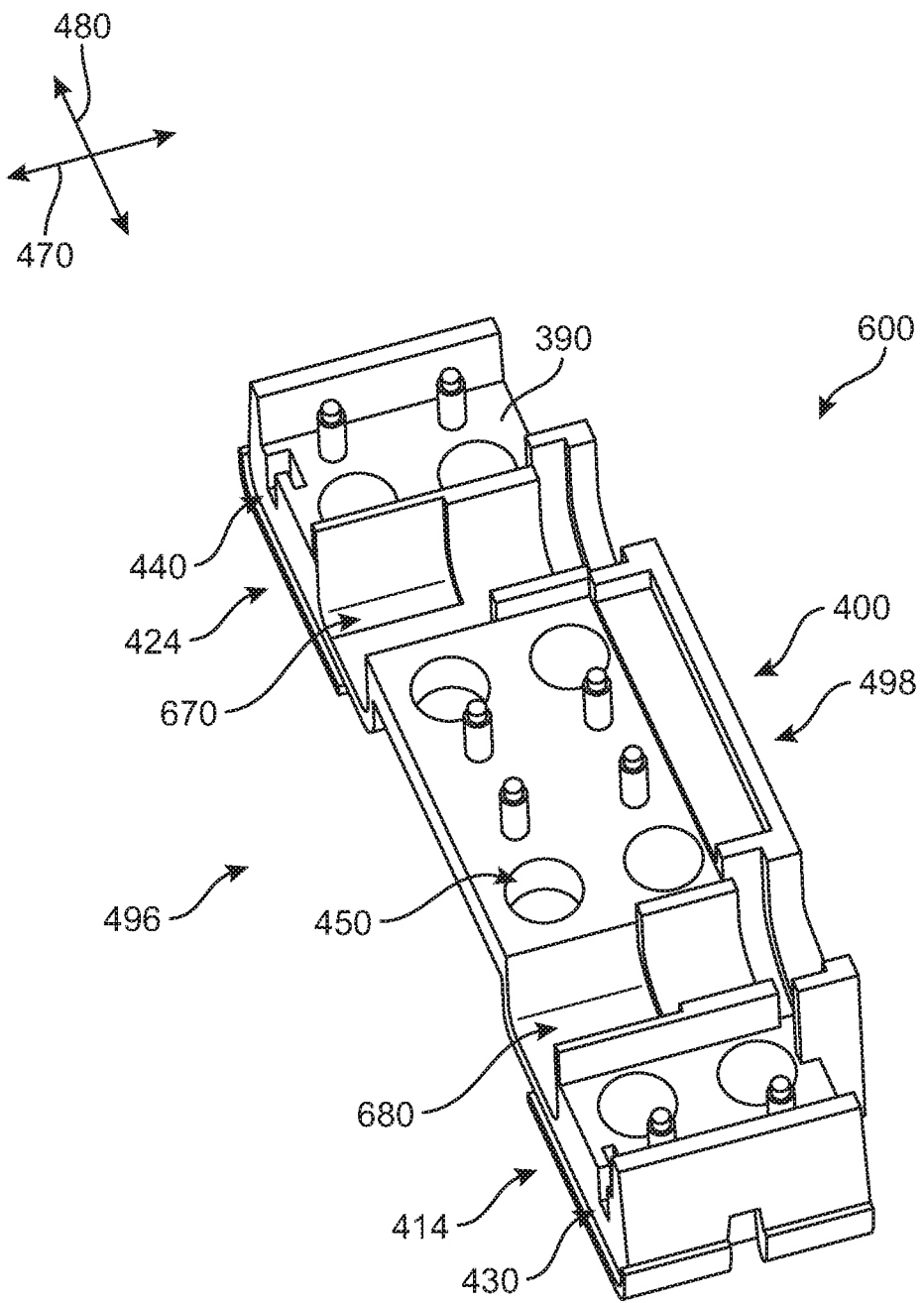
FIG. 7 is an isometric bottom view of an embodiment of a terminal modular cover segment.

As discussed above with respect to FIGS. 2 and 3, in some embodiments, a modular cover segment can comprise a terminal cover segment that can be connected to other types of modular cover segments. One embodiment of a terminal cover segment 600 is shown in FIGS. 6 and 7. FIG. 6 shows an isometric view of top side 290 of terminal cover segment 600, and FIG. 7 shows an isometric view of a bottom side 390 of terminal cover segment 600. In FIG. 6, it can be seen that central portion 400 further comprises a first raised portion 620 adjacent to first ridge portion 414 as well as a second raised portion 610 adjacent to second ridge portion 424. The thickness of each raised portion can vary, but in some embodiments it may be approximately or substantially similar to the thicknesses of adjacent ridge portions.

In some embodiments, the shape of raised portions can provide a compartment 660 along top side 290 of terminal cover segment 600. In one embodiment, compartment 660 can be similar to the U-shaped compartment of FIGS. 4 and 5. In other embodiments, as shown in FIG. 6, compartment 660 can include portions of varying dimensions and shape. For example, compartment 660 includes a receptacle section 630 formed a forward facing side 602 of terminal cover segment 600. In addition, receptacle section 630 extends toward a rearward facing side 604 and is in fluid communication with a passageway 640. Passageway 640 extends between receptacle section 630 and a chamber 650. Thus, passageway 640 connects and is fluid communication with both receptacle section 630 and chamber 650.

In different embodiments, the various portions of compartment 660 can vary in size. For example, receptacle section 630 has a first longitudinal width 612, passageway 640 has a second longitudinal width 614 that is smaller than first longitudinal width 612, and chamber 650 has a third longitudinal width 616 that is greater than second longitudinal width 614. In one embodiment, second longitudinal width 614 is smaller than either of first longitudinal width 612 and third longitudinal width 616. Furthermore, in some embodiments, first longitudinal width 612 is smaller than third longitudinal width 616, as shown in FIG. 6. Thus, in one embodiment, compartment 660 can have a roughly or approximately "I" cross-sectional shape in a horizontal plane. However, in other embodiments, the dimensions may differ than those shown herein.

In addition, in some embodiments, the dimensions of the channels can differ from the U-shaped channels of the previously illustrated embodiments (see FIGS. 4 and 5), providing a rounder, or arch-like opening along the sides of terminal cover segment 600. As shown in FIG. 6, forward facing side 602 includes a first archway 680 and a second archway 670 that each extend throughout the lateral width of the corresponding end portions (see FIG. 7).

Figure 20:
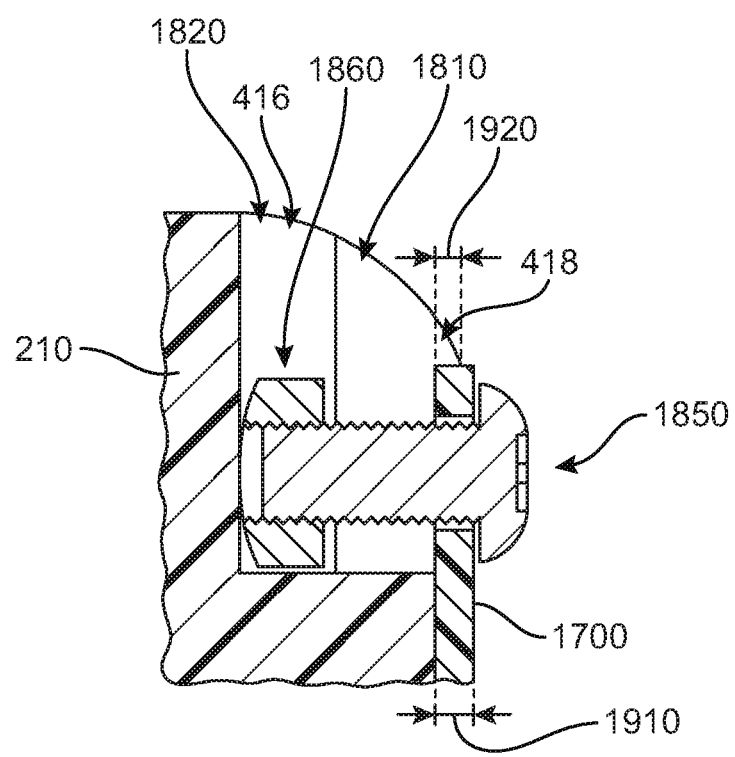
FIG. 20 is a cross-sectional view of an embodiment of a portion of a cover and a housing.

In different embodiments, each of the particular structural features of the terminal cover segment can be configured to receive specific portions associated with the battery system, as will be discussed further below with respect to FIG. 20.

Furthermore, apertures 450 can be formed through the raised portions in some embodiments. For example, as shown in FIG. 6, a first aperture 622 is disposed in first raised portion 620, extending through the entire vertical thickness of the raised portion. There may be a different number of apertures in terminal cover segment 600 relative to other modular cover segments in some embodiments. In FIGS. 6 and 7, terminal cover segment has the same number and general arrangement or pattern of apertures as the apertures discussed with respect to FIGS. 4 and 5.

While in some embodiments terminal cover segment 620 can include both slots and protruding portions to facilitate the interconnection between modular units, in other embodiments, a terminal cover segment or other modular segment associated with an end portion of a cover can include either slots or protruding portions. For example, in FIG. 7, it can be seen that terminal cover segment 600 includes first slot 430 and second slot 440 that are configured to engage with protruding portions formed in a corresponding modular segment. In other embodiments, the terminal cover segment can instead comprise the first protruding portion and the second protruding portion, which can be joined to slots on a corresponding modular segment.

As noted above, in different embodiments, the modular segments of the disclosed embodiments can be interconnected. In some embodiments, the modular segments may be manufactured so that the modules, units, or segments may be releasably interconnected or interlinked. In other words, the connecting mechanism(s) can allow a number of segments to be assembled together to form a number of different cover sizes or shapes. The cover segments may be coupled together through various mechanisms. In one embodiment, as mentioned earlier, the modular segments are provided with at least one projection or protruding portion and one corresponding slot or recess which have a generally complementary size and shape relative to one another, such that when the protruding portion of one segment is interconnected to the slot of another segment, the segments are coupled together. In some embodiments, the coupling mechanism can comprise a type of snap or friction fit or allow for a sliding engagement. In one embodiment, the segments once engaged may be permanently fixed, providing greater stability to the cover. In other embodiments, the segments can be releasably coupled, such that two segments may be separated again by either pushing or sliding the two segments apart, for example, allowing each segment to be reused or refitted in various cover types.

Figure 8:
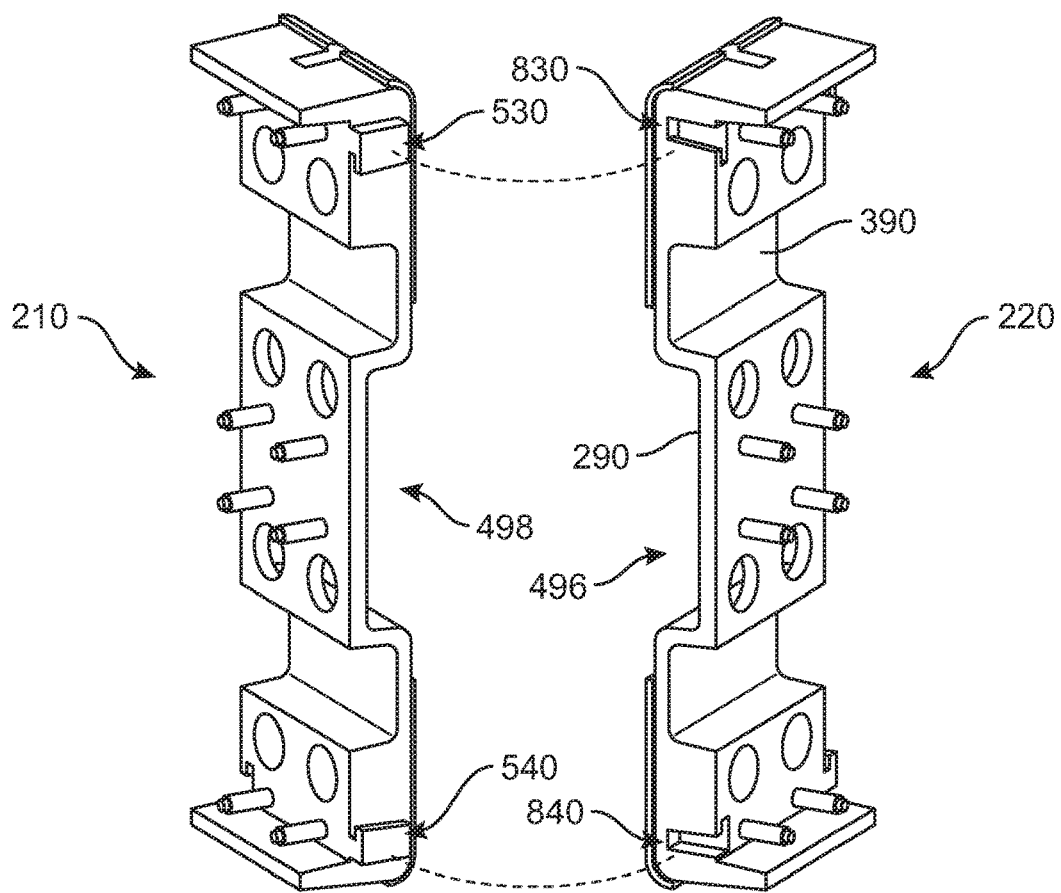
FIG. 8 is an isometric bottom view of an embodiment of a first modular cover segment and a second modular cover segment and a battery.
Figure 8:
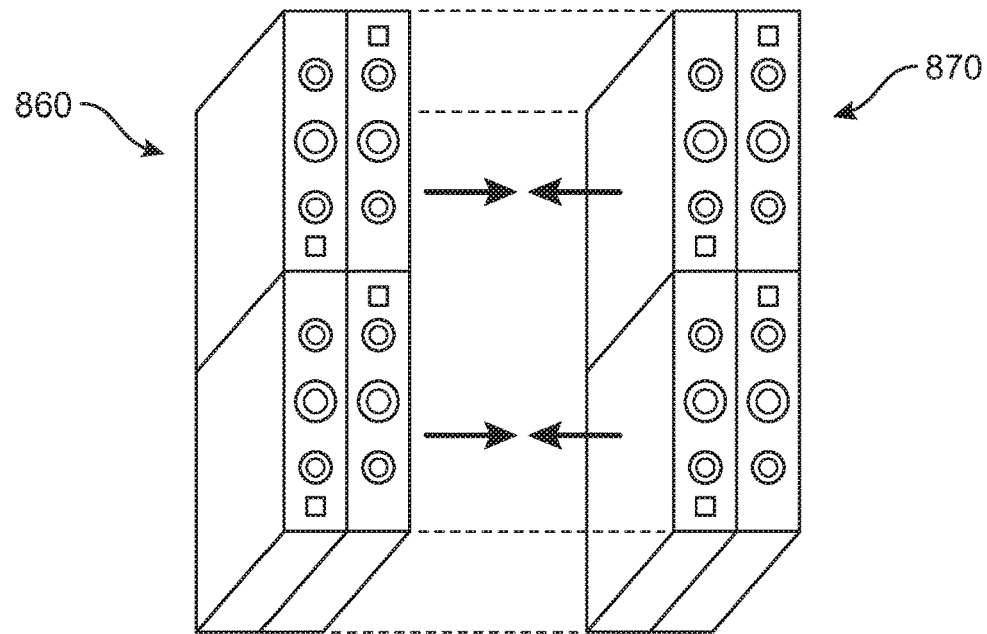

In FIG. 8, first segment 210 and second segment 220 are illustrated adjacent to one another in a disconnected state. Dotted lines represent a potential interconnection that may occur between a third slot 830 and first protruding portion 530, as well as between a fourth slot 840 and second protruding portion 540. Looking generally downward on first segment 210 and second segment 220 (i.e., facing bottom side 390) it can be seen that by raising second segment 220 slightly relative to first segment 210, first protruding portion 530 may be then slid downward and into the groove provided by third slot 830. Similarly, in some embodiments, second protruding portion 540 may also be slid downward and into the groove provided by fourth slot 840. In one embodiment, by a pushing or sliding downward of second segment 220, a locking or secure engagement between the two segments can occur as the protruding portion is received by and snugly fitted into a corresponding slot. Once the protruding portion has been inserted and pushed fully into the slot, the two adjacent or neighboring modular segments can comprise a substantially continuous, level, and/or flush outermost surface. In other words, a first outermost surface of the first modular segment can be substantially flush or continuous with a second outermost surface of the second modular surface when the first modular segment and the second modular segment are interconnected. This arrangement can provide a modular battery cover that is dimensioned and sized for use with a battery housing such as a housing that is configured to hold the battery represented by an assembly of a first battery cell 860 and a second battery cell 870, shown for purposes of illustration in FIG. 8.

Figure 9:
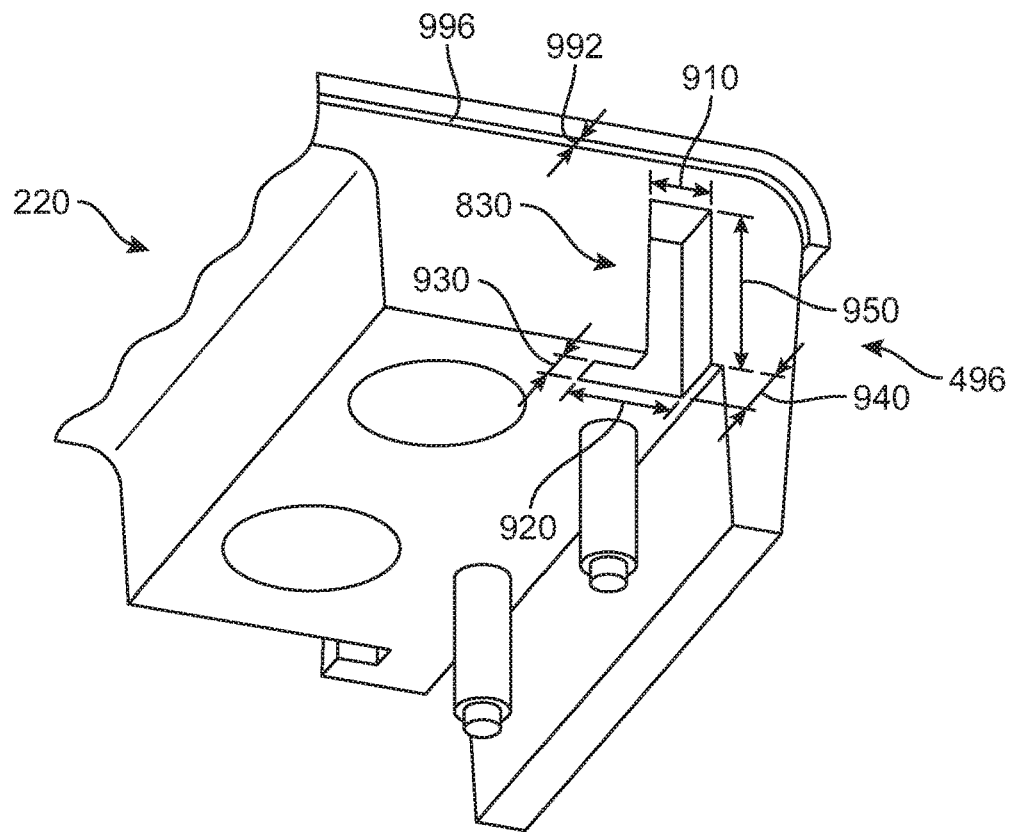
FIG. 9 is an isometric view of an embodiment of a connecting mechanism in the modular cover segments.
Figure 9:
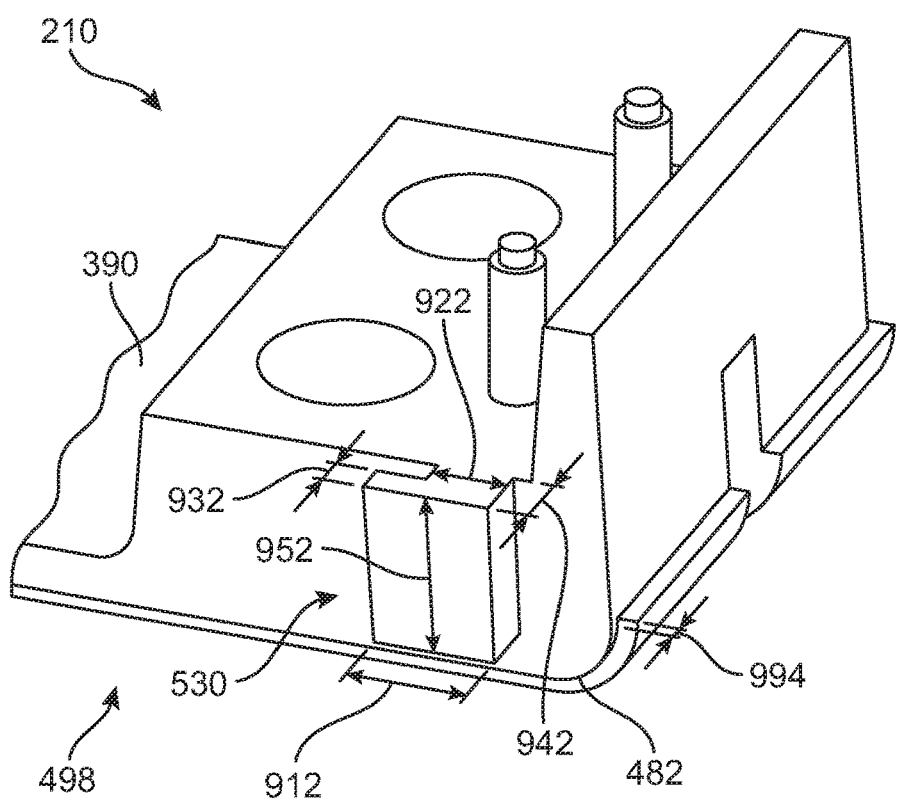

For purposes of clarity, in FIG. 9, magnified views of third slot 830 and first protruding portion 530 are shown. It can be seen that third slot 830 can have a shape and/or dimension that are configured to snugly receive first protruding portion 530 in one embodiment. In FIG. 9, third slot 830 has a first distal width 910 (associated with the portion formed directly in the periphery of the ridge portion) and a first proximal width 920 (associated with the portion formed further inward relative to the periphery of the ridge portion). In addition, third slot 830 includes first inner thickness 930 (associated with the portion of the ridge portion disposed nearer to the central portion) and a first outer thickness 940 (associated with the portion of the ridge portion disposed further to the central portion). In some embodiments, first distal width 910 is smaller than first proximal width 920. In addition, in one embodiment, first outer thickness 940 is greater than first inner thickness 930. Thus, in some embodiments, it can be seen that the shape of the groove or recess provided by third slot 830 has a cross-sectional shape that is substantially L-shaped in a horizontal plane.

Furthermore, first protruding portion 530 has a second distal width 912 (associated with the portion formed further away from the periphery of the ridge portion) and a second proximal width 922 (associated with the portion formed directly adjacent to the periphery of the ridge portion). In addition, first protruding portion 530 includes second inner thickness 932 (associated with the portion of the ridge portion disposed nearer to the central portion) and a second outer thickness 942 (associated with the portion of the ridge portion disposed further to the central portion). In some embodiments, second distal width 912 is larger than second proximal width 922. In addition, in one embodiment, second outer thickness 942 is greater than second inner thickness 932. Thus, in some embodiments, it can be seen that the shape of the projection or plug provided by first protruding portion 530 has a cross-sectional shape that is substantially L-shaped in a horizontal plane.

In different embodiments, when the dimensions of the two portions are compared, there may be substantial similarities. In one embodiment, first distal width 910 of third slot 830 is substantially similar to second proximal width 922 of first protruding portion 530, and first proximal width 920 of third slot 830 is substantially similar to second distal width 912 of first protruding portion 530. In addition, first inner thickness 930 of third slot 830 is substantially similar to second inner thickness 932 of first protruding portion 530, and first outer thickness 940 of third slot 830 is substantially similar to second outer thickness 942 of first protruding portion 530. Furthermore, in order to allow the sliding engagement to occur in some embodiments, it can be seen that a depth 950 of third slot 830 can be substantially similar to a height 952 of first protruding portion 530 in some embodiments.

It should be further observed in FIG. 9 that in some embodiments the width of the protruding portion and the slot can taper or decrease as they extend from bottom side 390 to top side 290. In other words, first proximal width 920 can gradually or gently decrease from one end to the opposite end in some embodiments, and second distal width 912 can also gradually or gently decrease from one end to the opposite end in some embodiments. This 'ramping' can allow counterpart angled surfaces of the first slot and the first protruding portion to fit flush against each other or level relative to one another in one embodiment. In addition, the mechanism described herein can allow each of the surfaces associated with the slot and protruding portion to press against one another and provide improved engagement by increasing resistance.

In addition, as noted previously with respect to FIGS. 4 and 5, it can be seen that in some embodiments second segment 220 includes a third overhang portion 996 on first side 496 and first segment 210 includes first recessed ledge 482 on second side 498. Third overhang portion 996 extends outward a first distance 992 and first recessed ledge 482 has a recess with a first distance or first width 994. In some embodiments, first distance 992 and first width 994 are substantially similar. Thus, in one embodiment, third overhang portion 996 of second segment 220 can be configured to snugly fit or be received by first recessed ledge 482 of first segment 210, which can increase the stability of the interconnection between two modular segments.

Figure 10:
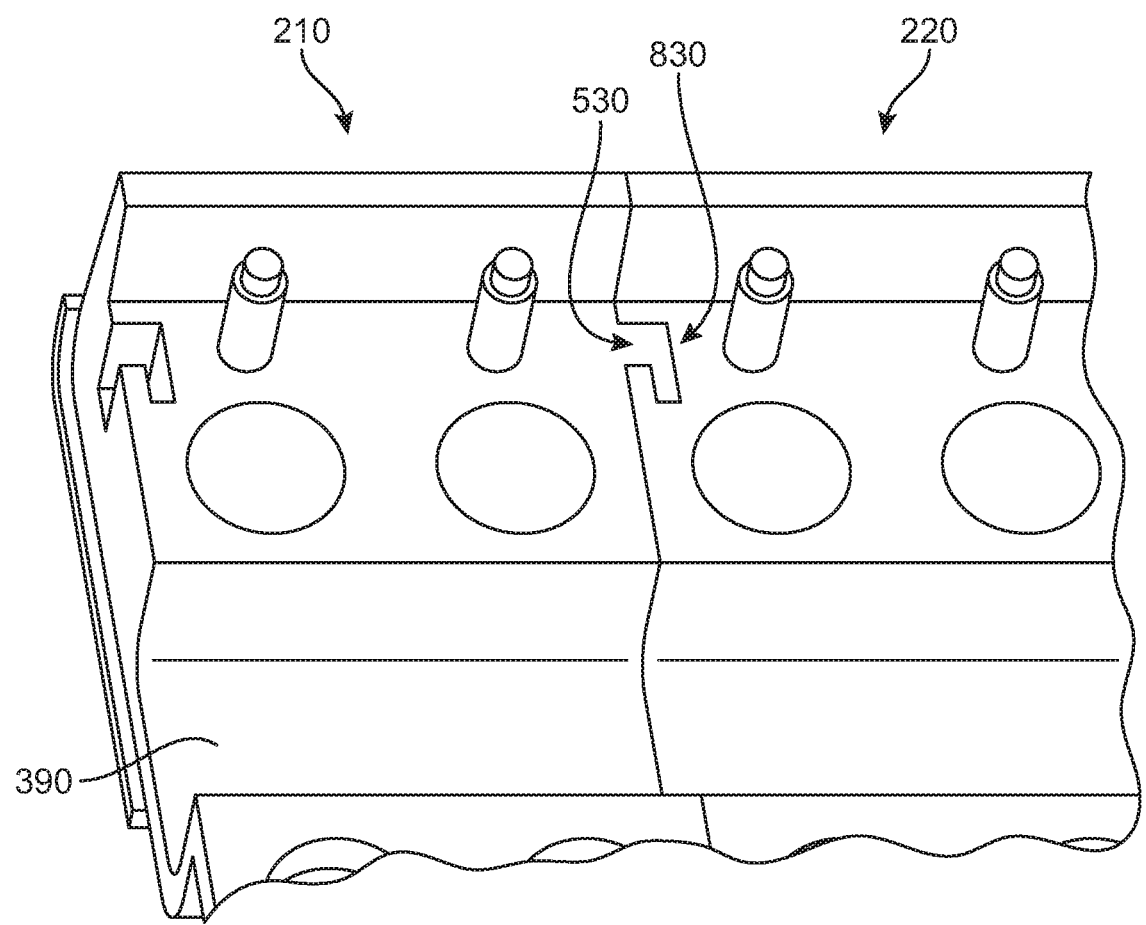
FIG. 10 is an isometric view of an embodiment of a connecting mechanism as the modular cover segments are connected to form a first modular cover.

Referring to FIG. 10, a magnified view of third slot 830 as it is interconnected with first protruding portion 530 is depicted. It can be seen that the L-shape of first protruding portion 530 is snugly received and surrounded by the L-shaped cavity provided by third slot 830. In different embodiments, this mechanism can provide the modular cover with a construction system where the connecting portions (e.g., the slots and protruding portions) have little play when they are connected, yet can also be put together and taken apart with little effort.

Figure 11:
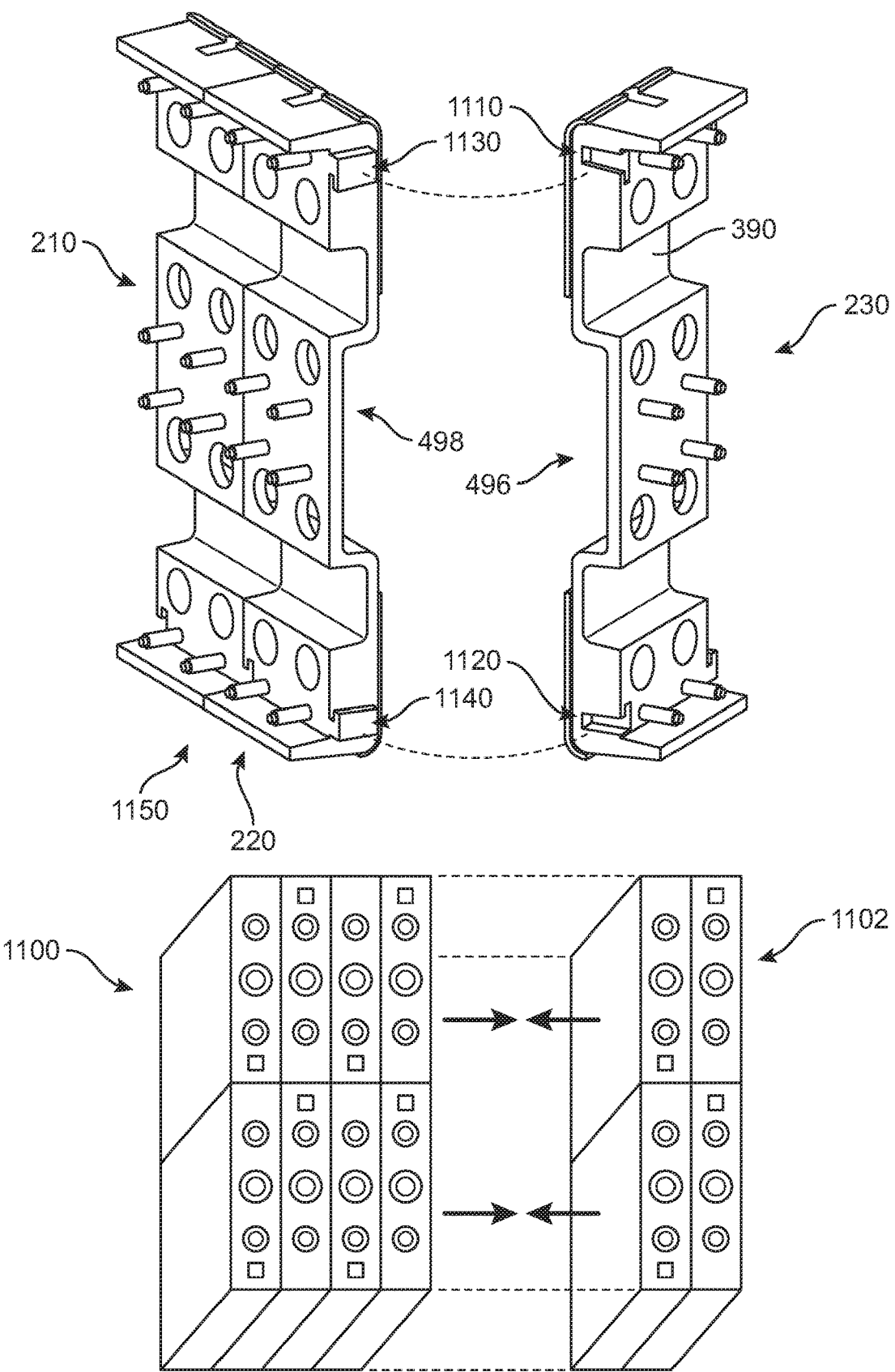
FIG. 11 is an isometric bottom view of an embodiment of the first modular cover and a third modular cover segment and a battery.

As noted above, the modular battery cover can comprise multiple modular segments. Thus, in some embodiments, the two-segment cover of FIG. 10 can be readily increased in size, as illustrated in FIGS. 11 and 12. In FIG. 10, a first cover 1150 comprising the joined pieces of first segment 210 and second segment 220 is shown adjacent to third segment 230 in a disconnected state. Dotted lines represent a potential interconnection that may occur between a fifth slot 1110 and a third protruding portion 1130, as well as between a sixth slot 1120 and a fourth protruding portion 1140. In some embodiments, third protruding portion 1130 may be slid downward and into the groove provided by fifth slot 1110. Similarly, in some embodiments, fourth protruding portion 1140 may be slid downward and into the groove provided by sixth slot 1120. In one embodiment, by a pushing or sliding upward of third segment 230, a locking or secure engagement between the two segments can occur as the protruding portion is received by and snugly fitted into a corresponding slot. This can provide a modular battery cover that is dimensioned and sized for use with a battery such as the battery represented by assembly of a third battery cell 1102 and a first assembled battery 1100, shown for purposes of illustration in FIG. 11. By coupling third segment 230 with first cover 1150, a second cover 1250 that is larger than first cover 1150 can be produced, as shown in FIG. 12. In one embodiment, second cover 1250 can be configured for use with a second assembled battery 1200 that is disposed in an appropriately sized housing.

Furthermore, as noted earlier with respect to FIG. 4, modular segments can include provisions for providing a flush interface between one segment and an adjacent segment. Referring to the cross-section in FIG. 12, it can be seen that when first segment 210, second segment 220, and third segment 230 are interconnected, third overhang portion 996 of second segment 220 is snugly fitted or received by first recessed ledge 482 of first segment 210. Similarly, a fourth overhang portion 1292 of third segment 230 is snugly fitted or received by a third recessed ledge 1284 of second segment 220. This 'offset' type of arrangement can facilitate the smooth, seam-like interface between each of the modular segments in some embodiments. In addition, the arrangement may allow the modular cover to have a more stable, flush, and continuous outer surface along the top side.

As noted above, a recessed ledge can be sized and dimensioned to fit the thickness and distance of a corresponding overhang portion of an adjacent modular segment. Thus, in FIG. 12, it can be seen that first segment 210 has first recessed ledge 482 with first depth 466 and second segment 220 has third overhang portion 996 has a third thickness 1264. In one embodiment, first depth 466 and third thickness 1264 are substantially similar, allowing a fit between the two portions where the top surface of the two covers are aligned and flush when the modular covers are assembled and joined together. In FIG. 12, third overhang portion 996 has been snugly received by first recessed ledge 482. Similarly, third recessed ledge 1284 has snugly received fourth overhang portion 1292. Furthermore, as described above with respect to FIGS. 4, 5, and 9, the overhang portions bulge or protrude outward relative to the main body of the modular segment by approximately the same distance or length as the widths of the recessed ledges. This can ensure that there are no significant gaps or spaces between two modular segments once they have been joined together, and provide the cover with a substantially smooth and continuous outer surface. In other words, in one embodiment, the battery cover has no gaps between modular segments that could expose portions of the battery that are intended to be covered.

Once a cover of the desired size or dimensions has been assembled, in some embodiments, additional components may be added to or associated with the cover. For example, referring to FIG. 13, an exploded view of an embodiment of a cover assembly 1300 is shown. Cover assembly 1300 can include various components in different embodiments, including but not limited to cover 130, film array 140, busbars 150, and/or securing components 160.

Some examples of different battery systems and components that may be associated with the battery system described herein and/or cover assembly 1300 are disclosed in previously cited applications to Huff et al., U.S. patent application Ser. No. 14/494,133, published as U.S. Patent Publication Number 2015/0086825 on Mar. 26, 2015 and entitled "Module Backbone System"; Huff et al., U.S. patent application Ser. No. 15/133,478 filed on Apr. 20, 2016, and entitled "System And Method For Providing Power To A Mining Operation"; and Huff et al., U.S. patent application Ser. No. 14/721,726, filed May 26, 2015, entitled "Module Maintenance System. The disclosed modular cover is designed so that it could be used with a connection array between the battery module and the cover as described in Huff et al., U.S. patent application Ser. No. 62/398,957 filed Sep. 23, 2016 on entitled "Unified Connection Array for Battery Module". The entire disclosures of these applications are incorporated herein by reference.

Figure 13:
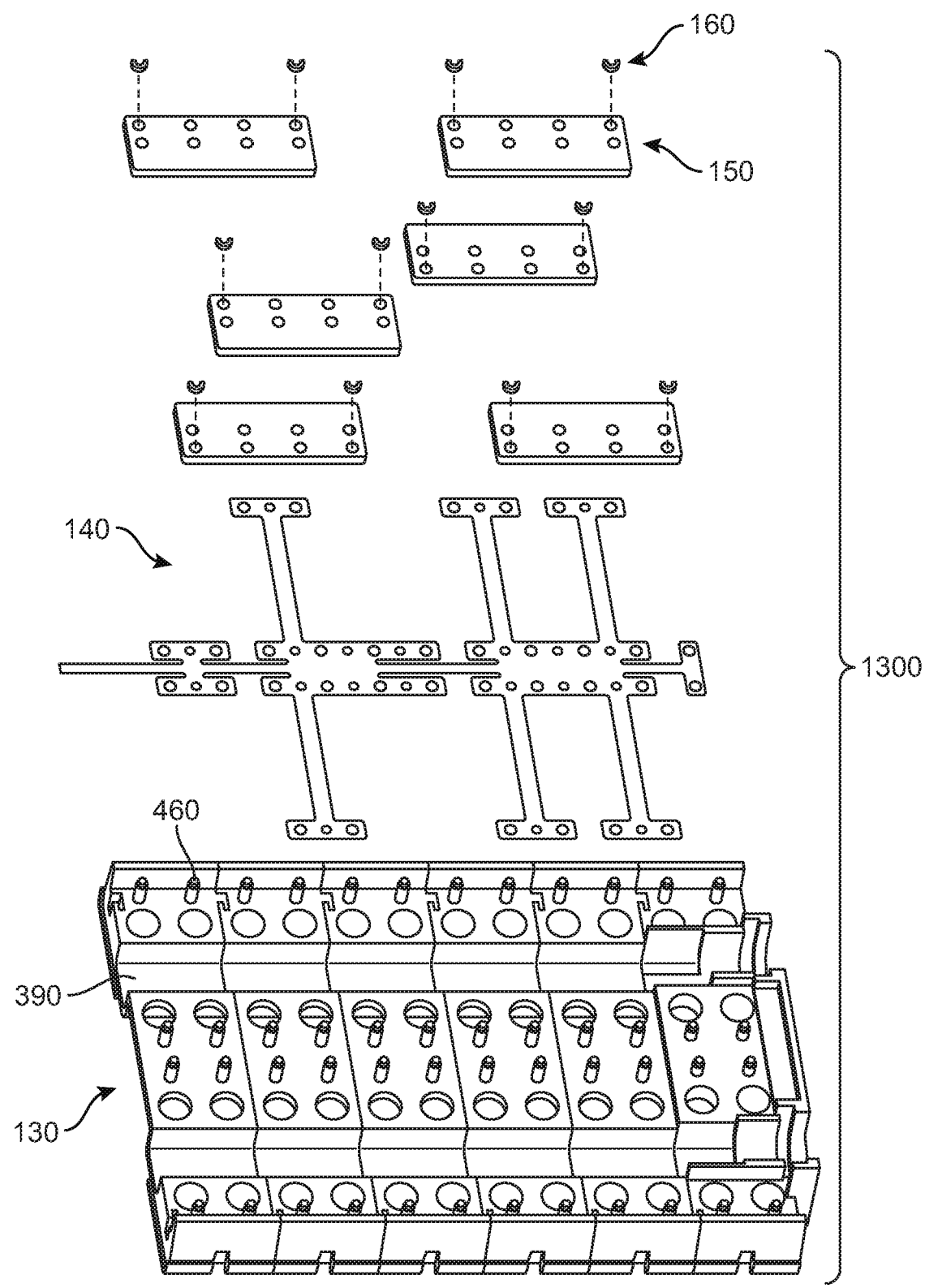
FIG. 13 is an exploded bottom view of an embodiment of a battery cover assembly.
Figure 14:
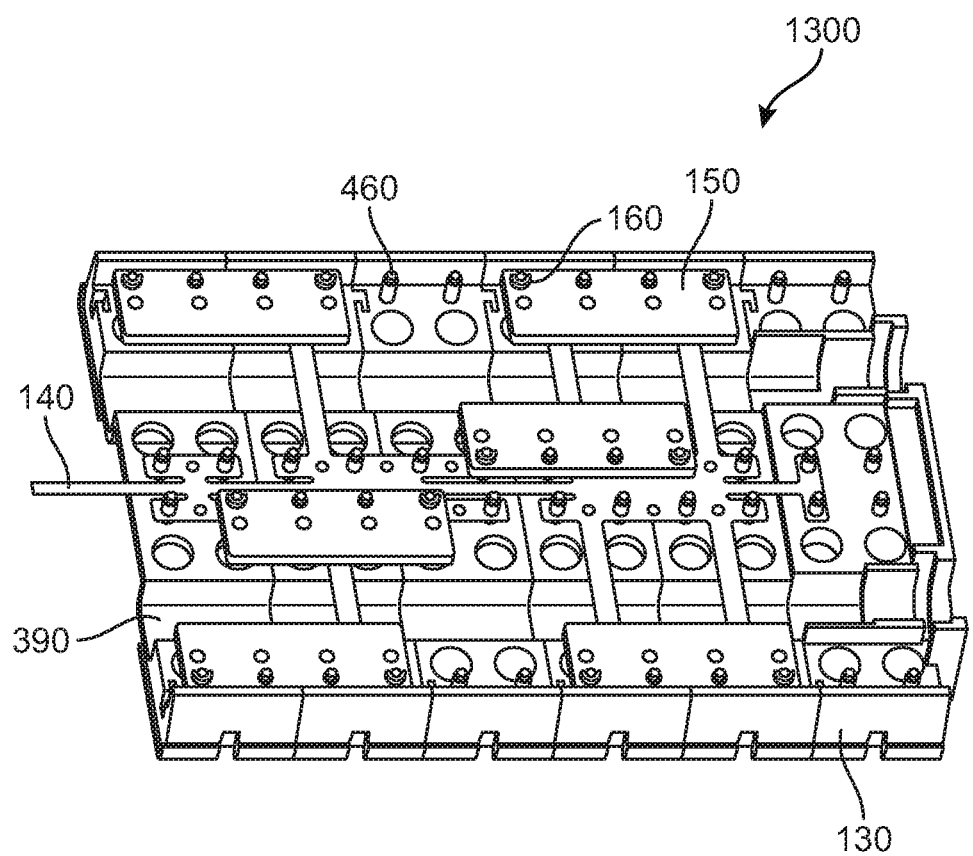
FIG. 14 is an assembled bottom view of an embodiment of a battery cover assembly.

As shown in FIG. 13, in order to build, produce, or assemble the various components of cover assembly 1300, cover 130 may be initially disposed in an 'upside-down' position, such that bottom side 390 is facing upward. Film array 140 may be disposed above bottom side 390, and busbars 150 arranged above film array 140. In other words, film array 140 can be disposed between bottom side 390 of cover 130 and busbars 150. Securing components 160 may be optionally included to provide improved stability to the assembly. In FIG. 14, cover assembly 1300 is depicted in the fully assembled state, where film array 140 is secured between cover 130 and busbars 150, and busbars are secured to cover 130 by securing components 160. As noted earlier with respect to FIGS. 4 and 5, elongated members 460 can be configured to facilitate assembly. For example, different portions of film array 140, busbars 150, and/or securing components 160 can include openings that can correspond in spacing and arrangement to elongated members 460, and allow each component to be positioned and held in place. However, in other embodiments, such an alignment may not occur.

Figure 15:
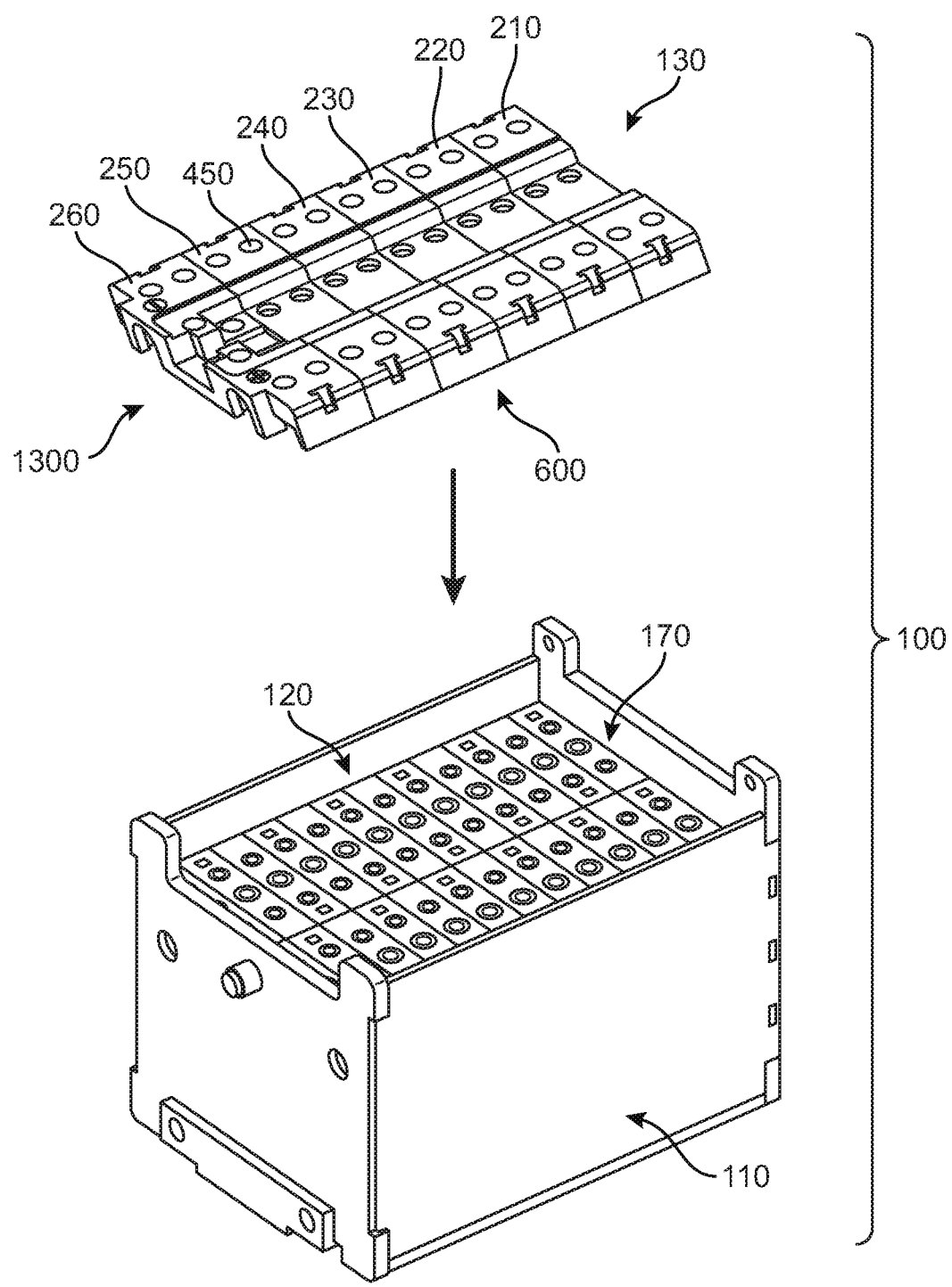
FIG. 15 is an exploded view of an embodiment of a battery system.
Figure 16:
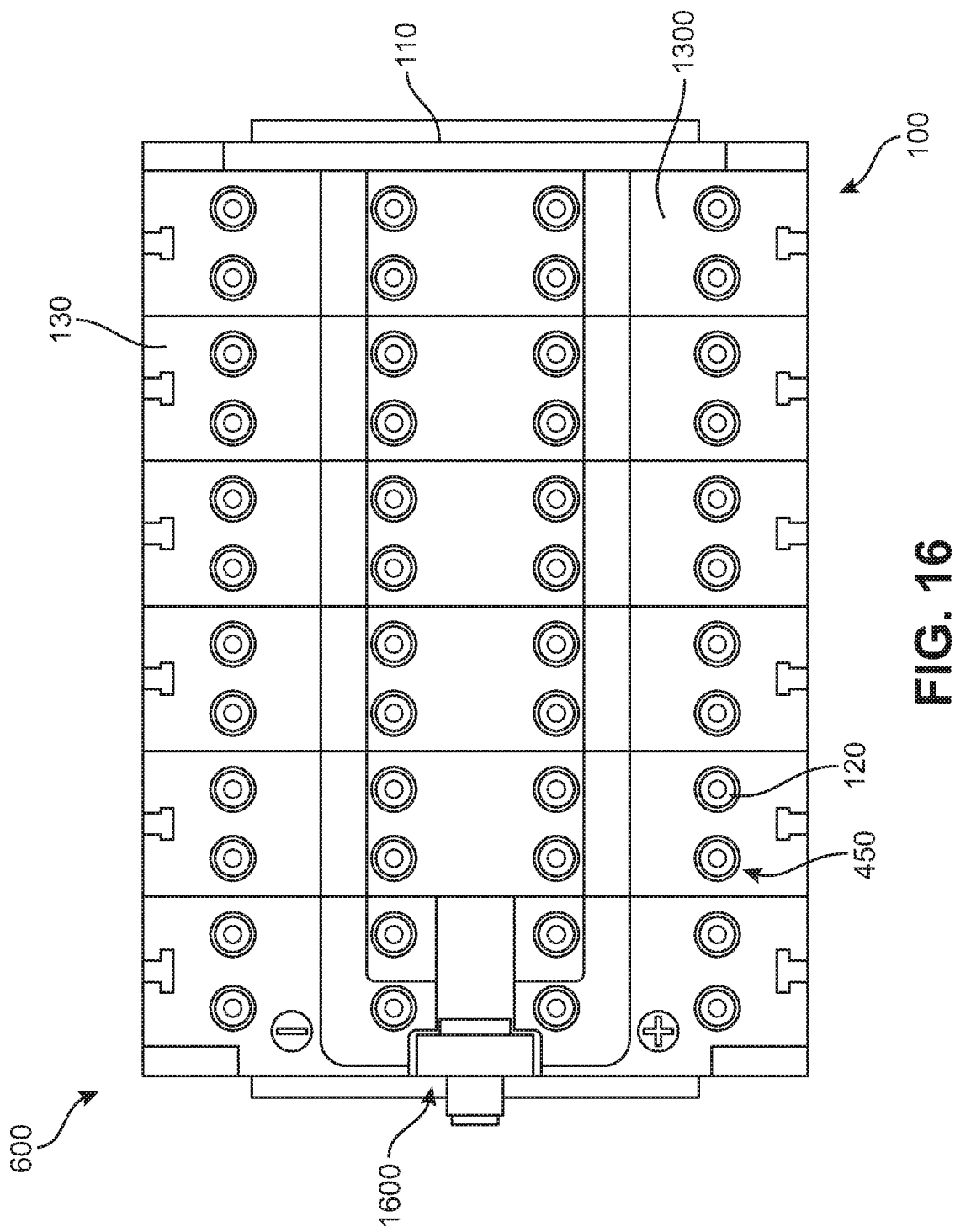
FIG. 16 is an assembled top view of an embodiment of a battery system.

In FIG. 15, cover assembly 1300 is shown above and adjacent to housing 110 holding battery 120. Cover assembly 1300 can be subsequently disposed or positioned to enclose battery system 100 by closing access opening 170. This step is depicted in the top-down view of FIG. 16, where cover assembly 1300 has been placed atop of battery 120. Portions of battery 120, busbars 150, and/or film array 140 can be visible through apertures 450 in some embodiments. Furthermore, it can be seen that a connecting device 1600 associated with battery 120 has been fitted snugly into the receptacle of terminal cover segment 600 (see FIG. 6).

Figure 17:
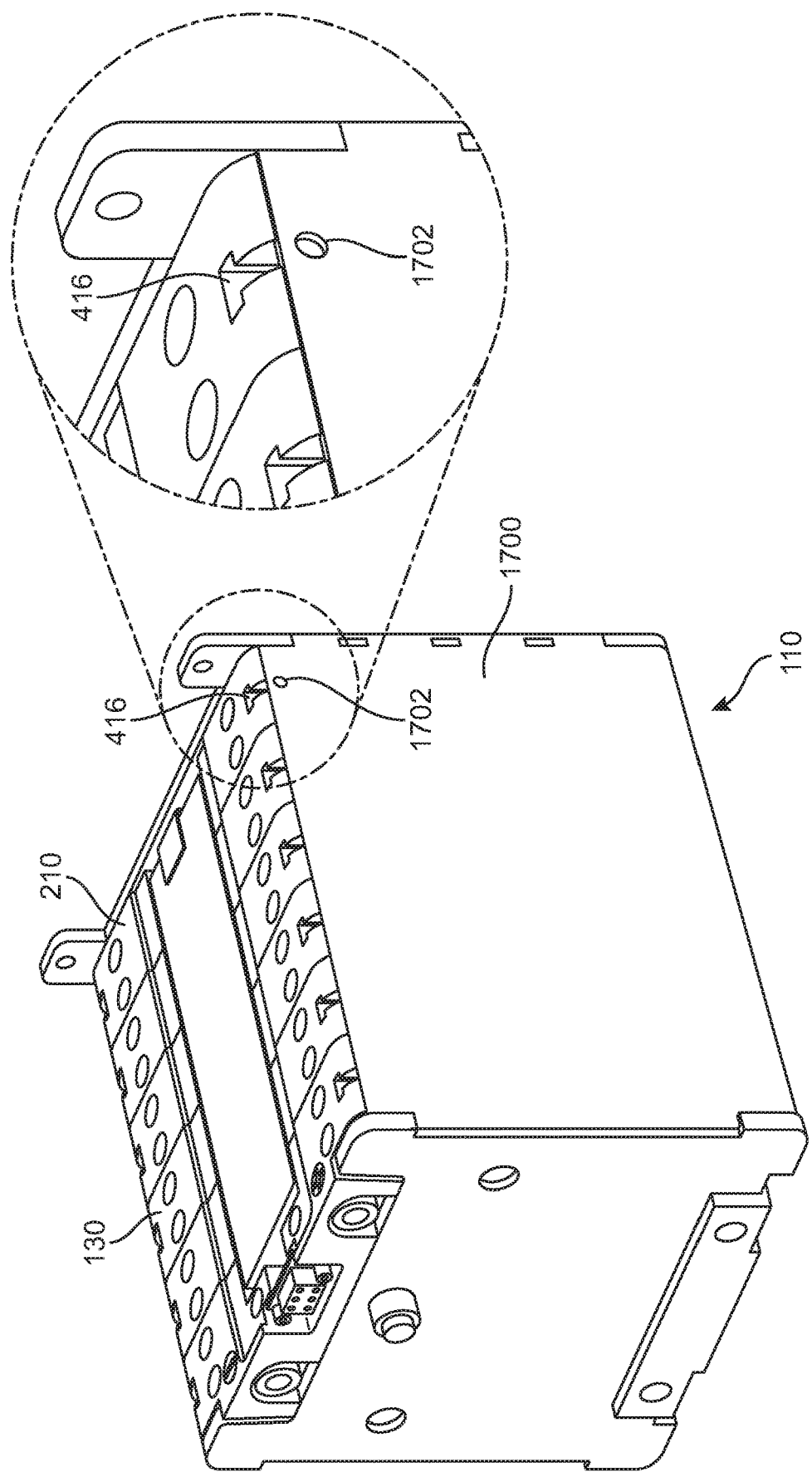
FIG. 17 is an assembled isometric side view of an embodiment of a battery system.
Figure 18:
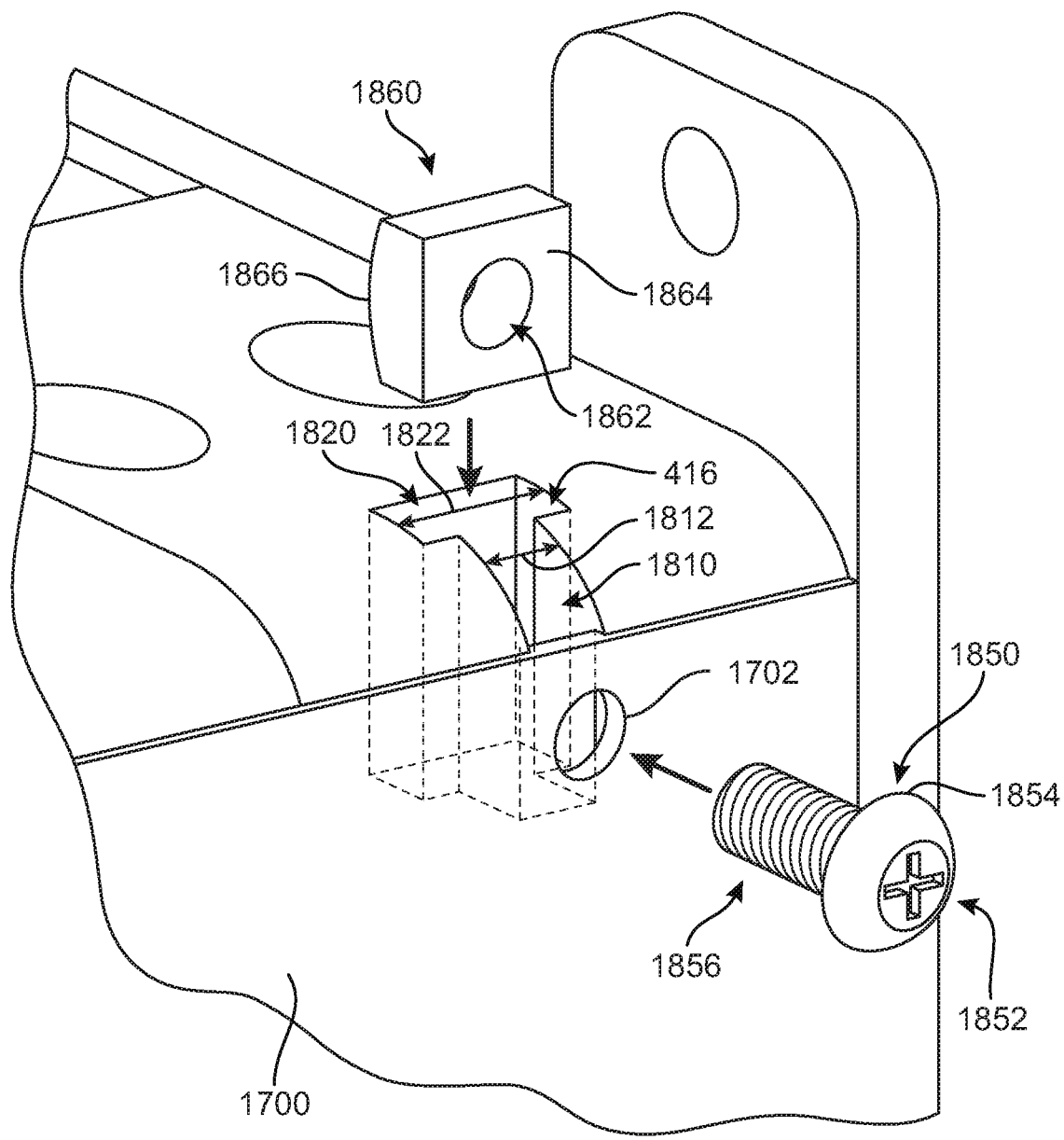
FIG. 18 is a view of an embodiment of a portion of a cover and a housing.

Furthermore, in some embodiments, battery system 100 can include provisions for receiving cover 130 and for securing cover 130 to housing 110. In FIG. 17, a magnified view of a corner portion of battery system 100 is illustrated. As described above with respect to FIG. 4, first segment 210 includes a first recess 416 and a second recess 426. In different embodiments, first recess 416 and/or second recess 426 can be configured for use with a portion of housing 110. In FIG. 17, a first side panel 1700 of housing 110 includes a through-hole 1702 extending from an outward-facing surface of first side panel 1700 through the thickness of first side panel 1700 to an inward-facing surface of first side panel 1700. In one embodiment, through-hole 1702 can have a substantially cylindrical shape, though in other embodiments, the shape and dimensions of through-hole 1702 can differ. In some embodiments, through-hole 1702 can be configured to snugly receive a portion of an engaging component such as a screw, as discussed below with respect to FIGS. 18-20.

In different embodiments, first recess 416 can be approximately aligned with through-hole 1702. In one embodiment, as shown in the cutaway views of FIGS. 18 and 19, first recess 416 can include a first chamber 1810 and a second chamber 1820 that are in fluid communication.

Furthermore, in one embodiment, first recess 416 can have a cross-section that is substantially T-shaped in the horizontal plane. In other words, first chamber 1810 has a first width 1812 and second chamber 1820 has a second width 1822 that is larger than first width 1812 in some embodiments. In some embodiments, first chamber 1810 can be in fluid communication with through-hole 1702 when cover 130 is positioned atop of housing 110.

In addition, in some embodiments, second chamber 1820 can be sized and dimensioned to hold a receiving component 1860. For example, in FIG. 18, receiving component 1860 in the form of a nut is shown positioned above second chamber 1820. In other embodiments, receiving component 1860 can comprise any other device for engaging with external fasteners or threaded devices. It can be seen that in some embodiments, receiving component 1860 can include provisions for secure positioning within second chamber 1822. For example, receiving component 1860 has a substantially planar or flat outer side 1864, and a substantially curved or rounded inner wall 1866 (where inner wall 1866 is an opposite facing side with respect to outer side 1864). When receiving component 1860 is inserted or disposed within the compartment provided by second chamber 1822, the curved inner wall facilitates a snug interface within the walls of second chamber 1822. In one embodiment, second chamber 1822 can also include a curved rear wall that has a curvature substantially similar to that of inner wall 1866 to facilitate the fit between receiving component 1860 and second chamber 1822.

Figure 19:
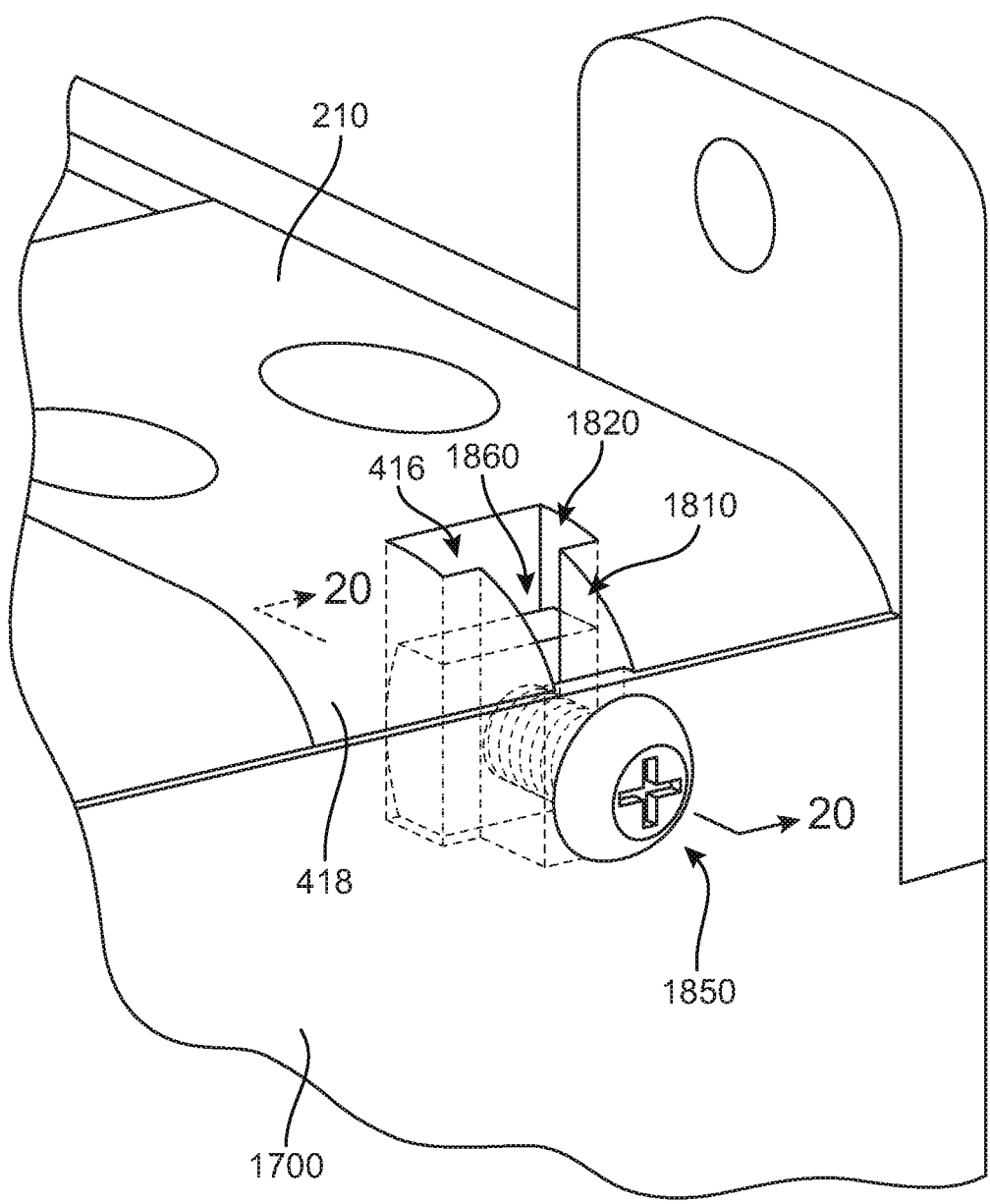
FIG. 19 is a view of an embodiment of a portion of a cover and a housing.

In different embodiments, an engaging component 1850 can provide a locking or fastening mechanism between the housing and the cover by utilizing the provisions described above. For purposes of reference, engaging component 1850 comprises a head portion 1852, a base portion 1854, and an external thread portion 1856. In one embodiment, the circumference or width of head portion 1852 can be substantially larger than that of external thread portion 1856 and/or the circumference of through-hole 1702. In some cases, engaging component 1850 may comprise a screw or other such fastener. Thus, as shown in FIG. 19, when engaging component 1850 is inserted or disposed into through-hole 1702, it may be received by the channel comprising the interior of through-hole 1702 and receiving component 1860 only to the extent of the length of external thread portion 1856. Once the substantially planar base portion contacts first side panel 1700 and the two surfaces are disposed flush against one another, it can be understood that the housing and the cover are properly secured. Furthermore, the length of external thread portion 1856 is at least greater than combined length of the thickness of the first side panel 1700 and the length of first chamber 1810, allowing external thread portion 1856 to engage with and/or come into contact with internal thread portion 1862 when engaging component 1850 is inserted into through-hole 1702 and receiving component 1860 (see FIG. 18).

In addition, as noted above, in some embodiments, cover 130 can comprise an edge or lip portion extending from a periphery of cover 130. First lip portion 418 can be better seen in the cross-section of FIG. 20 as it extends outward from the main body of the cover with a lip width 1920. The bottom surface of first lip portion 418 can be understood to be in direct contact and/or flush against the upper surface of first side panel 1700. In some embodiments, lip width 1920 can be substantially similar to panel thickness 1910 representing the width of the upper surface of first side panel 1700, providing a flush interface between the two surfaces. In other embodiments, lip width 1920 can be smaller than or greater than the thickness of first side panel 1700. In FIG. 20, lip width 1920 is smaller than panel thickness 1910. This contact between the lip portions associated with each modular cover segment and the perimeter of the housing can provide cover 130 with a stable resting platform and improve the secure positioning of the cover on the housing. Thus, in one embodiment, the lip portions extending from both end portions of each of the modular segments can rest or be placed on top of a portion of the perimeter of the housing.

Figure 21:
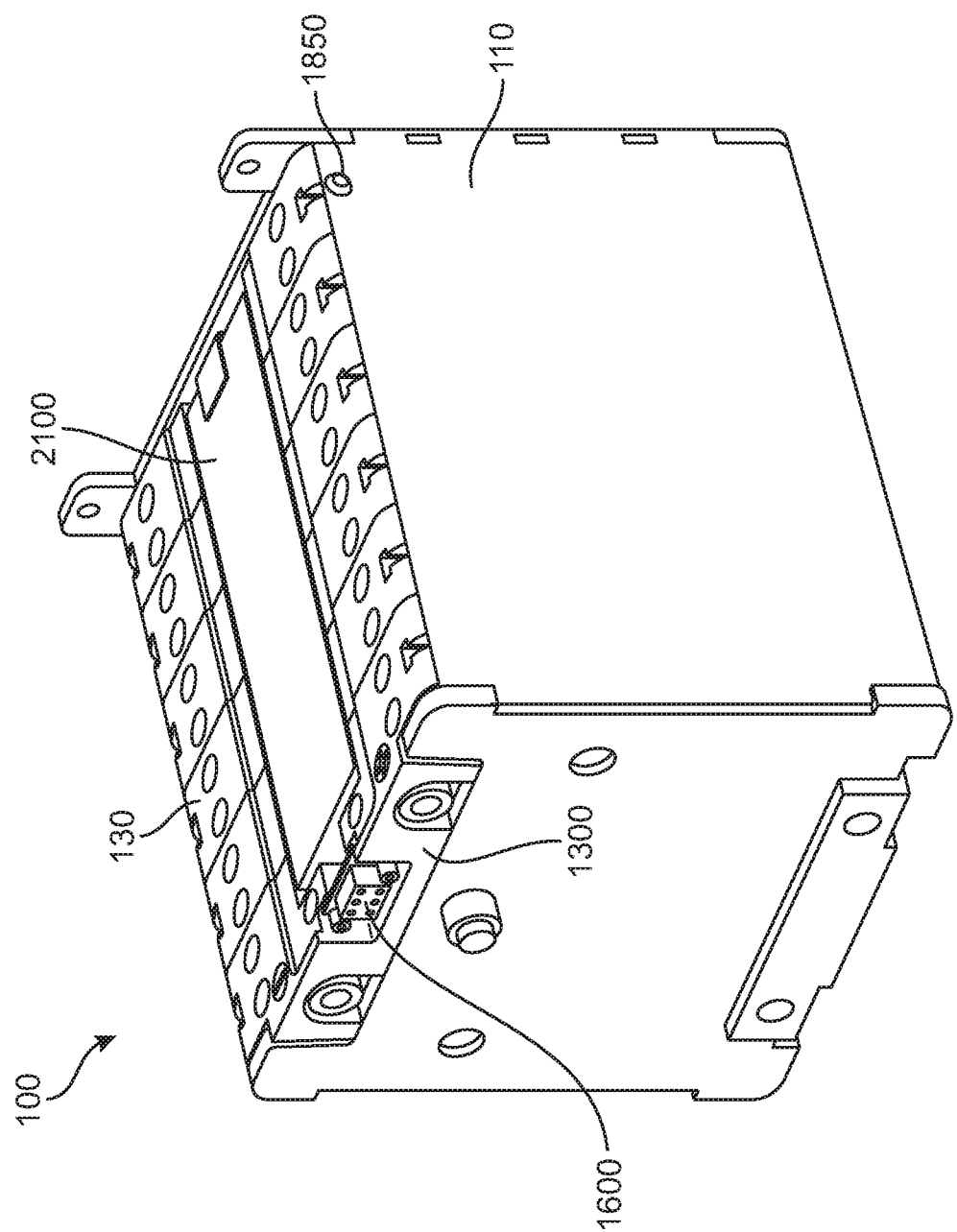
FIG. 21 is an isometric side view of an embodiment of a battery system.
Figure 22:
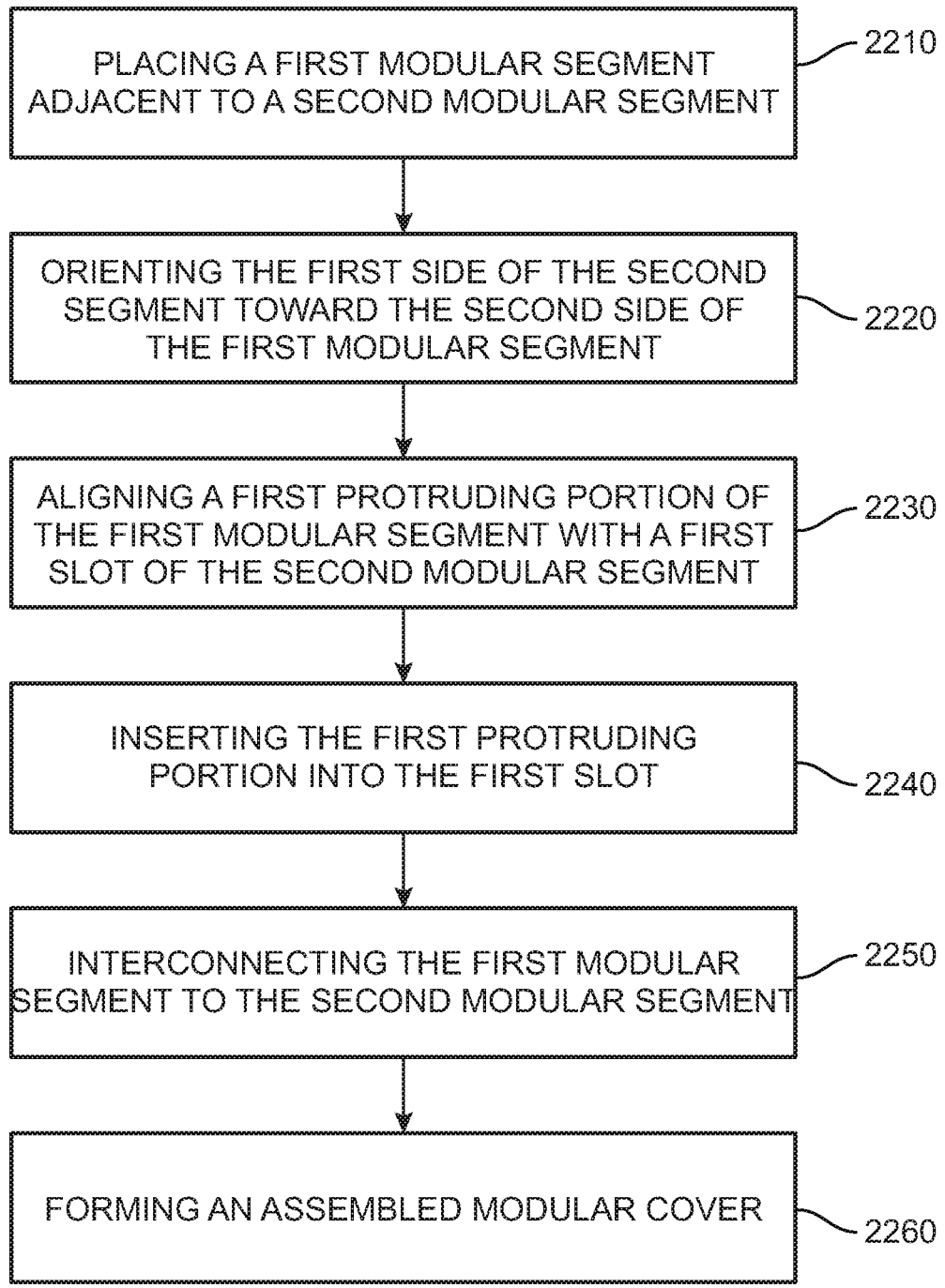
FIG. 22 is a flow chart depicting an embodiment of a method of assembling a modular cover.

In FIG. 21, an embodiment of the fully assembled battery system 100 is depicted. In FIG. 21, cover 130 is locked or secured to housing 110 as described above. The base portion of engaging component 1850 is disposed flush against first side panel 1700, and engaging component 1850 is further keyed with the receiving component.

Thus, in different embodiments, a modular cover may be assembled or manufactured that has one or more modular segments interconnected to one another. One embodiment of this process is generally represented in the flow diagram of FIG. 21. Referring to FIG. 21, in some embodiments, a first step 2110 may involve disposing, positioning, or otherwise placing a first modular segment adjacent to a second modular segment. In a second step 2120, the first modular segment and/or second modular segment can be oriented such that a first side of the second modular segment faces toward a second side of the first modular segment. In a third step 2130, a first protruding portion formed on the second side of the first modular segment may be aligned with a first slot formed on the first side of the second modular segment. Furthermore, in a fourth step 2140, the first protruding portion can be inserted into the first slot, thereby interconnecting the first modular segment to the second modular segment in a fifth step 2150. In some embodiments, additional modular segments can be added in a similar process, until the desired assembled modular cover is formed, as noted in a sixth step 2160.

In other embodiments, other or additional steps may occur during the process of assembly. For example, in order to interconnect the two modular segments, there may be a step of pushing the first protruding portion into the first slot until an outermost surface of the first modular segment is flush with an outermost surface of the second modular segment. In addition, in some embodiments, the assembled modular cover can be placed over a battery housing, thereby covering an access opening of the battery housing. In another embodiment, in order to secure the assembled modular cover to the battery housing, a receiving component may be inserted into a first recess formed on a peripheral portion of a first end portion of the first modular segment and an engaging component may be inserted through a hole formed along a sidewall of the battery housing, such that the engaging component can be threaded into the receiving component.

While various embodiments of the embodiment have been described, the description is intended to be exemplary, rather than limiting and it will be apparent to those of ordinary skill in the art that many more embodiments and implementations are possible that are within the scope of the embodiment. Although many possible combinations of features are shown in the accompanying figures and discussed in this detailed description, many other combinations of the disclosed features are possible. Therefore, it will be understood that any of the features shown and/or discussed in the present disclosure may be implemented together in any suitable combination. Accordingly, the embodiment is not to be restricted except in light of the attached claims and their equivalents. Also, various modifications and changes may be made within the scope of the attached claims.

What is claimed is:

1. A cover for a battery, the cover comprising: a plurality of modular segments, the plurality of modular segments including a first modular segment and a second modular segment;

each of the plurality of modular segments comprising a top side and a bottom side opposite the top side; each of the plurality of modular segments including a central portion comprising a horizontal planar surface along the top side of each of the plurality of modular segments, the central portion extending between a first end portion and a second end portion, the central portion including a cavity formed by a first inner sidewall and a second inner sidewall extending upwards away from the horizontal planar surface of the central portion along the top side of each of the plurality of modular segments between the first end portion and the second end portion;

each of the plurality of modular segments including a first channel extending through a width of the first end portion along the bottom side of the first end portion and a second channel extending through a width of the second end portion along the bottom side of the second end portion, wherein the first channel is bounded on one side by the first inner sidewall and wherein the second channel is bounded on one side by the second inner sidewall;

each of the plurality of modular segments including into two opposing sides relative to a central longitudinal axis extending from the first end portion to the second end portion, wherein the two opposing sides comprise a first side and a second side; each of the plurality of modular segments further including a plurality of elongated members extending from the bottom side, the plurality of elongated members being configured to correspond in spacing and arrangement with openings in a film array to hold the film array in place beneath the cover; the first modular segment including a first slot formed on the first side; the second modular segment including a first protruding portion formed on the second side; the first slot being configured to snugly receive the first protruding portion and provide an interconnection between the first modular segment and the second modular segment; and wherein a first outermost surface of the first modular segment is substantially continuous with a second outermost surface of the second modular segment when the first modular segment and the second modular segment are interconnected, wherein the first channel is bounded on a side opposite the first inner sidewall by a first ridge portion and wherein the second channel is bounded on a side opposite the second inner sidewall by a second ridge portion, wherein the plurality of elongated members includes two elongated members extending vertically outward from the first ridge portion and two elongated members extending vertically outward from the second ridge portion, and wherein the plurality of elongated members further includes a set of four elongated members extending vertically outward from the central portion of each modular segment.

2. The cover of claim 1, wherein the first modular segment further includes a second slot formed on the first side, wherein the second modular segment further includes a second protruding portion formed on the second side, and wherein the second slot is configured to snugly receive the second protruding portion and provide an interconnection between the first modular segment and the second modular segment.

3. The cover of claim 1, wherein the first slot has a cross-sectional L-shape in a horizontal plane and wherein the first protruding portion has a cross-sectional L-shape in the horizontal plane.

4. The cover of claim 1, wherein the first end portion and the second end portion are symmetrical relative to a central lateral axis that extends through the central portion such that the first end portion and the second end portion are mirror images of each other.

5. The cover of claim 1, wherein the first modular segment and the second modular segment are substantially similar in shape and size.

6. The cover of claim 2, further comprising a third modular segment, wherein the second modular segment includes a third slot formed on the first side, wherein the third modular segment includes a third protruding portion formed on the second side, and wherein the third slot is configured to snugly receive the third protruding portion and provide an interconnection between the second modular segment and the third modular segment.

7. The cover of claim 1, the plurality of modular segments including six modular segments that are joined together to form an assembled cover comprising a substantially continuous outermost surface.

8. The cover of claim 7, wherein a top side of the assembled cover includes a substantially rectangular recessed portion associated with the central portion of each modular segment, the recessed portion extending across all of the plurality of modular segments, the recessed portion providing a compartment that is configured to receive a battery component.

9. The cover of claim 1, wherein the first modular segment is a terminal modular segment, and wherein the terminal modular segment is disposed at one end of the cover.

10. A cover for a battery housing, the cover comprising: a plurality of modular segments, the plurality of modular segments including a first modular segment; each of the modular segments comprising a top side and a bottom side opposite the top side; each of the plurality of modular segments including a central portion comprising a horizontal planar surface along the top side of each of the plurality of modular segments, the central portion extending between a first end portion and a second end portion; each of the plurality of modular segments including a first channel extending through a width of the first end portion along the bottom side of the first end portion and a second channel extending through a width of the second end portion along the bottom side of the second end portion, wherein the first channel is bounded on one side by a first inner sidewall and wherein the second channel is bounded on one side by a second inner sidewall;

each of the plurality of modular segments including into two opposing sides relative to a central longitudinal axis extending from the first end portion to the second end portion, wherein the two opposing sides comprise a first side and a second side; the central portion being recessed with respect to the first end portion and the second end portion so as to form a cavity along the top side between the first end portion and the second end portion, wherein the cavity is formed by the first inner sidewall and the second inner sidewall extending upwards away from the horizontal planar surface of the central portion;

the first end portion including a first ridge portion adjacent to the first channel, the first ridge portion extending from the first side to the second side; the first end portion further including a first peripheral portion, wherein a first recess is formed through the first peripheral portion; a plurality of through-hole apertures being formed in each of the plurality of modular segments; a plurality of elongated members extending outward from the bottom side of each of the plurality of modular segments, the plurality of elongated members being configured to correspond in spacing and arrangement with openings in a film array to hold the film array in place beneath the cover; and wherein an outermost surface of each modular segment is substantially continuous with an outermost surface of each adjacent modular segment when the plurality of modular segments are interconnected, wherein the plurality of elongated members extending from the bottom side of each modular segment comprise: two elongated members extending vertically outward from the first end portion; two elongated members extending vertically outward from the second end portion; and a set of four elongated members extending vertically outward from the central portion.

11. The cover of claim 10, wherein each through-hole aperture of the plurality of through-hole apertures is disposed adjacent to an elongated member of the plurality of elongated members.

12. The cover of claim 10, wherein a first slot is disposed on the first side of the first modular segment in the first ridge portion.

13. The cover of claim 11, the plurality of modular segments further comprising a second modular segment, a first protruding portion extending from the second side of the first ridge portion of the second modular segment, wherein a first slot is configured to snugly receive the first protruding portion and provide an interconnection between the first modular segment and the second modular segment.

14. The cover of claim 13, wherein a second slot is disposed on the first side of a second ridge portion of the first modular segment, wherein a second protruding portion extends from the second side of the second ridge portion of the second modular segment, and wherein the second slot is configured to snugly receive the second protruding portion and provide an interconnection between the first modular segment and the second modular segment.

15. The cover of claim 10, the plurality of modular segments further comprising a third modular segment, wherein a third slot is disposed on the first side of the first ridge portion of the third modular segment, wherein a third protruding portion extends outward from the second side of the first ridge portion of the first modular segment, and wherein the third slot is configured to snugly receive the third protruding portion and provide an interconnection between the first modular segment and the third modular segment.

16. The cover of claim 10, wherein the first modular segment includes a first lip portion that extends outward from the first peripheral portion, and wherein the first lip portion is configured to rest upon a portion of a sidewall of the housing.

\* \* \* \* \*